(12) United States Patent
Wu et al.

(10) Patent No.: US 12,497,066 B2
(45) Date of Patent: Dec. 16, 2025

(54) SELF-DRIVING VEHICLE TEST METHOD, APPARATUS, AND SYSTEM

(71) Applicant: Shenzhen Yinwang Intelligent Technologies Co., Ltd., Guangdong (CN)

(72) Inventors: Hao Wu, Shenzhen (CN); Bende Yu, Hangzhou (CN); Liangzhuang Zhang, Hangzhou (CN); Yi Jiang, Suzhou (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 232 days.

(21) Appl. No.: 18/140,123

(22) Filed: Apr. 27, 2023

(65) Prior Publication Data

US 2023/0399012 A1    Dec. 14, 2023

Related U.S. Application Data

(63) Continuation of application No. PCT/CN2021/101255, filed on Jun. 21, 2021.

(30) Foreign Application Priority Data

Oct. 29, 2020 (CN) .......................... 202011186659.2

(51) Int. Cl.
*B60W 60/00* (2020.01)
*G06F 11/3668* (2025.01)
*G06V 20/58* (2022.01)

(52) U.S. Cl.
CPC ....... *B60W 60/001* (2020.02); *G06F 11/3684* (2013.01); *G06V 20/582* (2022.01); *B60W 2420/403* (2013.01)

(58) Field of Classification Search
CPC ........... B60W 60/001; B60W 2420/403; G06F 11/3684; G06F 11/3698; G06F 30/15; G06F 30/20; G06V 20/582
See application file for complete search history.

(56) References Cited

U.S. PATENT DOCUMENTS

2016/0314224 A1* 10/2016 Wei ...................... G05D 1/0088

FOREIGN PATENT DOCUMENTS

| CN | 107727411 A | 2/2018 | |
| CN | 108829087 A * | 11/2018 | ......... G05B 23/0213 |

(Continued)

*Primary Examiner* — Peter D Nolan
*Assistant Examiner* — Anwar Mohamed
(74) *Attorney, Agent, or Firm* — WOMBLE BOND DICKINSON (US) LLP

(57) ABSTRACT

A self-driving vehicle test method, apparatus, and system are provided, and relate to the field of self-driving technologies. The system includes a software control module, a motion control module, and a plurality of motion platforms. The software control module may obtain information about a first test scenario, and send the information about the first test scenario to the motion control module. After receiving the information about the first test scenario, the motion control module may determine a test motion platform and a target motion platform from the plurality of motion platforms based on the information about the first test scenario, and send parameter information of each determined motion platform to the motion platform, so that the motion platform performs a corresponding operation based on the parameter information. In this way, a self-driving vehicle can be tested without participation of test personnel, thereby improving test efficiency and reducing labor costs.

20 Claims, 9 Drawing Sheets

(56) References Cited

FOREIGN PATENT DOCUMENTS

| | | | |
|---|---|---|---|
| CN | 108873864 A | 11/2018 | |
| CN | 109187041 A | 1/2019 | |
| CN | 109632331 A | 4/2019 | |
| CN | 110082122 A * | 8/2019 | .......... G01M 17/007 |
| CN | 110096006 A | 8/2019 | |
| CN | 108829087 B | 9/2019 | |
| CN | 111595595 A | 8/2020 | |

* cited by examiner

SELF-DRIVING VEHICLE TEST METHOD, APPARATUS, AND SYSTEM

CROSS-REFERENCE TO RELATED APPLICATIONS

This application is a continuation of International Application No. PCT/CN2021/101255, filed on Jun. 21, 2021, which claims priority to Chinese Patent Application No. 202011186659.2, filed on Oct. 29, 2020. The disclosures of the aforementioned applications are hereby incorporated by reference in their entireties.

TECHNICAL FIELD

This application relates to the field of self-driving technologies, and in particular, to a self-driving vehicle test method, apparatus, and system.

BACKGROUND

A self-driving vehicle is also referred to as an unmanned driving vehicle or a computer driving vehicle, and is an intelligent vehicle that implements unmanned driving by using a computer system. When traveling on a real road, a self-driving vehicle needs to cope with complex and changeable traffic scenarios. To ensure driving safety of the self-driving vehicle, a large quantity of tests need to be performed before the self-driving vehicle can travel on the road.

There are three test modes for self-driving vehicles: a simulation test, a closed site test, and a large-scale open road test. The simulation test is performed by using simulation software, which is greatly different from a case in which a vehicle travels on a real road, and a test result is inaccurate. The large-scale open road test enables the self-driving vehicle to travel on a real road for testing. Although a test result is accurate, test costs are high. The closed site test is to test the self-driving vehicle by simulating various specified scenarios in a closed test site. A test result is accurate, and test costs are low. Therefore, the closed site test is widely used.

Currently, the closed site test requires participation of test personnel. For example, the test personnel need to set a test parameter of a test scenario, and import the test parameter into a device of a vehicle, which causes problems of low test efficiency and high labor costs.

SUMMARY

This application provides a self-driving vehicle test method, apparatus, and system, so that a self-driving vehicle can be tested without participation of test personnel, thereby improving test efficiency and reducing labor costs.

To achieve the foregoing objectives, the following technical solutions are used in embodiments of this application.

According to a first aspect, an embodiment of this application provides a self-driving vehicle test system, where the system includes a software control module, a motion control module, and a plurality of motion platforms, the software control module is communicatively connected to the motion control module, the motion control module is communicatively connected to the plurality of motion platforms, the plurality of motion platforms are communicatively connected to each other, the plurality of motion platforms include a test motion platform and a target motion platform, the test motion platform is a tested motion platform, and the target motion platform is a motion platform that assists in testing in a test scenario; the software control module is configured to: obtain information about a first test scenario, and send the information about the first test scenario to the motion control module, where the information about the first test scenario is used to indicate a quantity of test motion platforms, a quantity of target motion platforms, and parameter information of each motion platform in the first test scenario, and the parameter information of the motion platform is used to indicate a motion status of the motion platform in the first test scenario; the motion control module is configured to: receive the information about the first test scenario from the software control module, determine a test motion platform and a target motion platform from the plurality of motion platforms based on the information about the first test scenario, send parameter information of each determined test motion platform to the test motion platform, and send parameter information of each determined target motion platform to the target motion platform; the determined test motion platform is configured to: receive the parameter information of the test motion platform from the motion control module, and perform a first operation based on the parameter information of the test motion platform; and the determined target motion platform is configured to: receive the parameter information of the target motion platform from the motion control module, and perform a second operation based on the parameter information of the target motion platform.

According to the system provided in the first aspect, the software control module may obtain the information about the first test scenario, and send the information about the first test scenario to the motion control module. After receiving the information about the first test scenario, the motion control module may determine a test motion platform and a target motion platform from the plurality of motion platforms based on the information about the first test scenario, and send parameter information of each determined motion platform to the motion platform, so that the motion platform performs a corresponding operation based on the parameter information of the motion platform. In this way, a self-driving vehicle can be tested without participation of test personnel, thereby improving test efficiency and reducing labor costs. In addition, a test process is closed-loop control (without participation of test personnel), which can reduce an accumulated error in the test process and make a test result more accurate. It can be understood that, in a conventional technology, when there are a relatively large quantity of vehicles in a test scenario, test personnel need to configure a parameter of each vehicle, and import the parameter of each vehicle into the vehicle. This causes a relatively heavy workload and takes a relatively long time. If the system provided in the first aspect is used, efficiency can be greatly improved.

In an embodiment, the test system further includes a positioning module, the positioning module is communicatively connected to the software control module, and the positioning module is communicatively connected to the plurality of motion platforms; the positioning module is configured to obtain position information of the determined test motion platform and position information of the determined target motion platform, and send the position information of the determined test motion platform and the position information of the determined target motion platform to the software control module; and the software control module is further configured to: receive the position information of the determined test motion platform and the position information of the determined target motion platform from the positioning module, and display positions of the determined test motion platform and the determined target motion platform on a map based on the position information of the determined test motion platform and the position information of the determined target motion platform. Based on the foregoing implementation, the software control module may display the positions of the determined test motion platform and the determined target motion platform on the map. In this way, the test personnel can observe the motion status of the motion platform in the first test scenario in real time.

In an embodiment, the test system further includes a sensing module, and the sensing module is communicatively connected to the software control module; the sensing module is configured to: obtain image information of the first test scenario, and send the image information of the first test scenario to the software control module; and the software control module is further configured to receive the image information of the first test scenario from the sensing module, and display an image corresponding to the image information of the first test scenario. Based on the foregoing implementation, the software control module may display the image corresponding to the image information of the first test scenario, so that test personnel observe a status of the motion platform in the first test scenario.

In an embodiment, the software control module is further configured to: obtain test data of the determined test motion platform, and determine a test result of the determined test motion platform based on the test data. Based on the foregoing implementation, the software control module may obtain the test data of the determined test motion platform, and determine the test result of the determined test motion platform based on the test data, so that the test personnel determine whether the determined test motion platform is qualified.

In an embodiment, the parameter information of the motion platform includes at least one of the following parameters: information about an initial position of the motion platform in the first test scenario, a trigger condition that is of the first test scenario and that is corresponding to the motion platform, an end condition that is of the first test scenario and that is corresponding to the motion platform, a motion speed of the motion platform, information about a motion track of the motion platform, and parameter configuration information of the motion platform in a motion process. Based on the foregoing implementation, the software control module may obtain a plurality of parameters of the motion platform. The motion platform can simulate a more accurate test scenario. In addition, the motion platform can simulate more test scenarios.

In an embodiment, the first test scenario includes at least one of the following scenarios: a traffic light recognition and response scenario, a traffic sign and marking recognition and response scenario, a front-vehicle driving status recognition and response scenario, an obstacle recognition and response scenario, a pedestrian and non-motor vehicle recognition and avoidance scenario, a vehicle-following driving scenario, a side parking scenario, an overtaking scenario, a lane changing scenario, an intersection communication scenario, a roundabout communication scenario, and an emergency braking scenario. Based on the foregoing implementation, the test system can test the foregoing various test scenarios, and cover a wide range of test scenarios.

In an embodiment, the information about the first test scenario further includes configuration information of the test motion platform in the first test scenario. Based on the foregoing implementation, the test system may further filter the motion platform based on the configuration information of the motion platform, to achieve a test objective.

According to a second aspect, an embodiment of this application provides self-driving vehicle test method, and the method includes: A software control module obtains information about a first test scenario, where the information about the first test scenario is used to indicate a quantity of test motion platforms, a quantity of target motion platforms, and parameter information of each motion platform in the first test scenario, the test motion platform is a tested motion platform, the target motion platform is a motion platform that assists in testing in a test scenario, and the parameter information of the motion platform is used to indicate a motion status of the motion platform in the first test scenario; and the software control module sends the information about the first test scenario to a motion control module.

According to the method provided in the second aspect, the software control module may obtain the information about the first test scenario, and send the information about the first test scenario to the motion control module, so that the motion control module determines a test motion platform and a target motion platform based on the information about the first test scenario, and sends parameter information of each determined motion platform to the motion platform, so that the motion platform performs a corresponding operation based on the parameter information of the motion platform. In this way, a self-driving vehicle can be tested without participation of test personnel, thereby improving test efficiency and reducing labor costs. In addition, a test process is closed-loop control (without participation of test personnel), which can reduce an accumulated error in the test process and make a test result more accurate. It can be understood that, in a conventional technology, when there are a relatively large quantity of vehicles in a test scenario, test personnel need to configure a parameter of each vehicle, and import the parameter of each vehicle into the vehicle. This causes a relatively heavy workload and takes a relatively long time. If the method provided in the second aspect is used, efficiency can be greatly improved.

In an embodiment, the method further includes: The software control module receives position information of a determined test motion platform and position information of a determined target motion platform from a positioning module, where the determined test motion platform and the determined target motion platform are motion platforms determined by the motion control module based on the information about the first test scenario; and the software control module displays positions of the determined test motion platform and the determined target motion platform on a map based on the position information of the determined test motion platform and the position information of the determined target motion platform. Based on the foregoing implementation, the software control module may display the positions of the determined test motion platform and the determined target motion platform on the map. In this way, the test personnel can observe the motion status of the motion platform in the first test scenario in real time.

In an embodiment, the method further includes: The software control module receives image information of the first test scenario from a sensing module; and the software control module displays an image corresponding to the image information of the first test scenario. Based on the foregoing implementation, the software control module may display the image corresponding to the image information of the first test scenario, so that test personnel observe a status of the motion platform in the first test scenario.

In an embodiment, the software control module obtains test data of the determined test motion platform, where the determined test motion platform is a motion platform determined by the motion control module based on the information about the first test scenario; and the software control module determines a test result of the determined test motion platform based on the test data. Based on the foregoing implementation, the software control module may obtain the test data of the determined test motion platform, and determine the test result of the determined test motion platform based on the test data, so that the test personnel determine whether the determined test motion platform is qualified.

In an embodiment, the parameter information of the motion platform includes at least one of the following parameters: information about an initial position of the motion platform in the first test scenario, a trigger condition that is of the first test scenario and that is corresponding to the motion platform, an end condition that is of the first test scenario and that is corresponding to the motion platform, a motion speed of the motion platform, information about a motion track of the motion platform, and parameter configuration information of the motion platform in a motion process. Based on the foregoing implementation, the software control module may obtain a plurality of parameters of the motion platform. The motion platform can simulate a more accurate test scenario. In addition, the motion platform can simulate more test scenarios.

In an embodiment, the first test scenario includes at least one of the following scenarios: a traffic light recognition and response scenario, a traffic sign and marking recognition and response scenario, a front-vehicle driving status recognition and response scenario, an obstacle recognition and response scenario, a pedestrian and non-motor vehicle recognition and avoidance scenario, a vehicle-following driving scenario, a side parking scenario, an overtaking scenario, a lane changing scenario, an intersection communication scenario, a roundabout communication scenario, and an emergency braking scenario. Based on the foregoing implementation, the foregoing various test scenarios can be tested, and a wide range of test scenarios is covered.

In an embodiment, the information about the first test scenario further includes configuration information of the test motion platform in the first test scenario. Based on the foregoing implementation, the motion platform can be filtered based on the configuration information of the motion platform, to achieve a test objective.

According to a third aspect, an embodiment of this application provides a self-driving vehicle test method, where the method includes: A motion control module receives information about a first test scenario from a software control module, where the information about the first test scenario is used to indicate a quantity of test motion platforms, a quantity of target motion platforms, and parameter information of each motion platform in the first test scenario, the test motion platform is a tested motion platform, the target motion platform is a motion platform that assists in testing in a test scenario, and the parameter information of the motion platform is used to indicate a motion status of the motion platform in the first test scenario; the motion control module determines a test motion platform and a target motion platform from a plurality of motion platforms based on the information about the first test scenario; the motion control module sends parameter information of each determined test motion platform to the test motion platform; and the motion control module sends parameter information of each determined target motion platform to the target motion platform.

According to the method provided in the third aspect, the motion control module may receive the information about the first test scenario from the software control module, determine the test motion platform and the target motion platform from the plurality of motion platforms based on the information about the first test scenario, and send the parameter information of each determined motion platform to the motion platform, so that the motion platform performs a corresponding operation based on the parameter information of the motion platform. In this way, a self-driving vehicle can be tested without participation of test personnel, thereby improving test efficiency and reducing labor costs. In addition, a test process is closed-loop control (without participation of test personnel), which can reduce an accumulated error in the test process and make a test result more accurate. It can be understood that, in a conventional technology, when there are a relatively large quantity of vehicles in a test scenario, test personnel need to configure a parameter of each vehicle, and import the parameter of each vehicle into the vehicle. This causes a relatively heavy workload and takes a relatively long time. If the method provided in the third aspect is used, efficiency can be greatly improved.

In an embodiment, the parameter information of the motion platform includes at least one of the following parameters: information about an initial position of the motion platform in the first test scenario, a trigger condition that is of the first test scenario and that is corresponding to the motion platform, an end condition that is of the first test scenario and that is corresponding to the motion platform, a motion speed of the motion platform, information about a motion track of the motion platform, and parameter configuration information of the motion platform in a motion process. Based on the foregoing implementation, the parameter information of the motion platform may include a plurality of types of parameters. The motion platform can simulate a more accurate test scenario. In addition, the motion platform can simulate more test scenarios.

In an embodiment, the first test scenario includes at least one of the following scenarios: a traffic light recognition and response scenario, a traffic sign and marking recognition and response scenario, a front-vehicle driving status recognition and response scenario, an obstacle recognition and response scenario, a pedestrian and non-motor vehicle recognition and avoidance scenario, a vehicle-following driving scenario, a side parking scenario, an overtaking scenario, a lane changing scenario, an intersection communication scenario, a roundabout communication scenario, and an emergency braking scenario. Based on the foregoing implementation, the foregoing various test scenarios can be tested, and a wide range of test scenarios is covered.

In an embodiment, the information about the first test scenario further includes configuration information of the test motion platform in the first test scenario. Based on the foregoing implementation, the motion control module can filter the motion platform based on the configuration information of the motion platform, to achieve a test objective.

According to a fourth aspect, an embodiment of this application provides a self-driving vehicle test method, where the method includes: A first motion platform receives parameter information of the first motion platform from a motion control module, where the parameter information of the first motion platform is used to indicate a motion status of the first motion platform in a first test scenario, and the first motion platform is a test motion platform or a target motion platform; and the first motion platform performs a first operation based on the parameter information of the first motion platform.

According to the method provided in the fourth aspect, the first motion platform may receive the parameter information of the first motion platform from the motion control module, and perform a corresponding operation based on the parameter information of the first motion platform. In this way, a self-driving vehicle can be tested without participation of test personnel, thereby improving test efficiency and reducing labor costs. In addition, a test process is closed-loop control (without participation of test personnel), which can reduce an accumulated error in the test process and make a test result more accurate. It can be understood that, in a conventional technology, when there are a relatively large quantity of vehicles in a test scenario, test personnel need to configure a parameter of each vehicle, and import the parameter of each vehicle into the vehicle. This causes a relatively heavy workload and takes a relatively long time. If the method provided in the fourth aspect is used, efficiency can be greatly improved.

In an embodiment, the method further includes: The first motion platform sends test data of the first motion platform to a software control module, where the test data of the first motion platform includes data obtained by the first motion platform in a process of performing a test in the first test scenario. Based on the foregoing implementation, the software control module may obtain the test data of the first motion platform, and determine the test result of the first motion platform based on the test data, so that the test personnel determine whether the first motion platform is qualified.

In an embodiment, the test motion platform is a tested motion platform, and the target motion platform is a motion platform that assists in testing in a test scenario.

In an embodiment, the parameter information of the first motion platform includes at least one of the following parameters: information about an initial position of the first motion platform in the first test scenario, a trigger condition that is of the first test scenario and that is corresponding to the first motion platform, an end condition that is of the first test scenario and that is corresponding to the first motion platform, a motion speed of the first motion platform, information about a motion track of the first motion platform, and parameter configuration information of the first motion platform in a motion process. Based on the foregoing implementation, the parameter information of the first motion platform may include a plurality of types of parameters. The first motion platform can simulate a more accurate test scenario. In addition, the first motion platform can simulate more test scenarios.

According to a fifth aspect, an embodiment of this application provides a test apparatus, to implement the method in any one of the second aspect or the possible implementations of the second aspect. The apparatus includes a corresponding unit or component configured to perform the foregoing method. The unit included in the apparatus may be implemented by software and/or hardware. For example, the apparatus may be a software control module, or a chip, a chip system, or a processor that can support the software control module in implementing the foregoing method.

According to a sixth aspect, an embodiment of this application provides a test apparatus, to implement the method in any one of the third aspect or the possible implementations of the third aspect. The apparatus includes a corresponding unit or component configured to perform the foregoing method. The unit included in the apparatus may be implemented by software and/or hardware. For example, the apparatus may be a motion control module, or a chip, a chip system, or a processor that can support the motion control module in implementing the foregoing method.

According to a seventh aspect, an embodiment of this application provides a test apparatus, to implement the method in any one of the fourth aspect or the possible implementations of the fourth aspect. The apparatus includes a corresponding unit or component configured to perform the foregoing method. The unit included in the apparatus may be implemented by software and/or hardware. For example, the apparatus may be a first motion platform, or a chip, a chip system, or a processor that can support the first motion platform in implementing the foregoing method.

According to an eighth aspect, an embodiment of this application provides a test apparatus, including a processor, where the processor is coupled to a memory, the memory is configured to store a program or instructions, and when the program or the instructions are executed by the processor, the apparatus is enabled to implement the method according to any two of the possible implementations of the second aspect or the first aspect.

According to a ninth aspect, an embodiment of this application provides a test apparatus, including a processor, where the processor is coupled to a memory, the memory is configured to store a program or instructions, and when the program or the instructions are executed by the processor, the apparatus is enabled to implement the method according to any one of the third aspect or the possible implementations of the third aspect.

According to a tenth aspect, an embodiment of this application provides a test apparatus, including a processor, where the processor is coupled to a memory, the memory is configured to store a program or instructions, and when the program or the instructions are executed by the processor, the apparatus is enabled to implement the method according to any one of the fourth aspect or the possible implementations of the fourth aspect.

According to an eleventh aspect, an embodiment of this application provides a test apparatus. The apparatus is configured to implement the method according to any one of the second aspect or the possible implementations of the second aspect.

According to a twelfth aspect, an embodiment of this application provides a test apparatus. The apparatus is configured to implement the method according to any one of the third aspect or the possible implementations of the third aspect.

According to a thirteenth aspect, an embodiment of this application provides a test apparatus. The apparatus is configured to implement the method according to any one of the fourth aspect or the possible implementations of the fourth aspect.

According to a fourteenth aspect, an embodiment of this application provides a computer-readable medium. The computer-readable medium stores a computer program or instructions, and when the computer program or instructions are executed, a computer is enabled to perform the method according to any one of the second aspect or the possible implementations of the second aspect.

According to a fifteenth aspect, an embodiment of this application provides a computer-readable medium. The computer-readable medium stores a computer program or instructions, and when the computer program or instructions are executed, a computer is enabled to perform the method according to any one of the third aspect or the possible implementations of the third aspect.

According to a sixteenth aspect, an embodiment of this application provides a computer-readable medium. The computer-readable medium stores a computer program or instructions, and when the computer program or instructions are executed, a computer is enabled to perform the method according to any one of the fourth aspect or the possible implementations of the fourth aspect.

According to a seventeenth aspect, an embodiment of this application provides a computer program product, and the computer program product includes computer program code. When the computer program code is run on a computer, the computer is enabled to perform the method according to any one of the second aspect or the possible implementations of the second aspect.

According to an eighteenth aspect, an embodiment of this application provides a computer program product, and the computer program product includes computer program code. When the computer program code is run on a computer, the computer is enabled to perform the method according to any one of the third aspect or the possible implementations of the third aspect.

According to a nineteenth aspect, an embodiment of this application provides a computer program product, and the computer program product includes computer program code. When the computer program code is run on a computer, the computer is enabled to perform the method according to any one of the fourth aspect or the possible implementations of the fourth aspect.

According to a twentieth aspect, an embodiment of this application provides a chip, including a processor, where the processor is coupled to a memory, the memory is configured to store a program or instructions, and when the program or the instructions are executed by the processor, the chip is enabled to implement the method according to any one of the second aspect or the possible implementations of the second aspect.

According to a twenty-first aspect, an embodiment of this application provides a chip, including a processor, where the processor is coupled to a memory, the memory is configured to store a program or instructions, and when the program or the instructions are executed by the processor, the chip is enabled to implement the method according to any one of the third aspect or the possible implementations of the third aspect.

According to a twenty-second aspect, an embodiment of this application provides a chip, including a processor, where the processor is coupled to a memory, the memory is configured to store a program or instructions, and when the program or the instructions are executed by the processor, the chip is enabled to implement the method according to any one of the fourth aspect or the possible implementations of the fourth aspect.

It may be understood that any test apparatus, chip, computer-readable medium, computer program product, or the like provided above is configured to perform a corresponding method provided above. Therefore, for beneficial effects that can be achieved by the test apparatus, the chip, the computer-readable medium, or the computer program product, refer to beneficial effects in the corresponding method. Details are not described herein again.

DESCRIPTION OF EMBODIMENTS

Figure 1A:
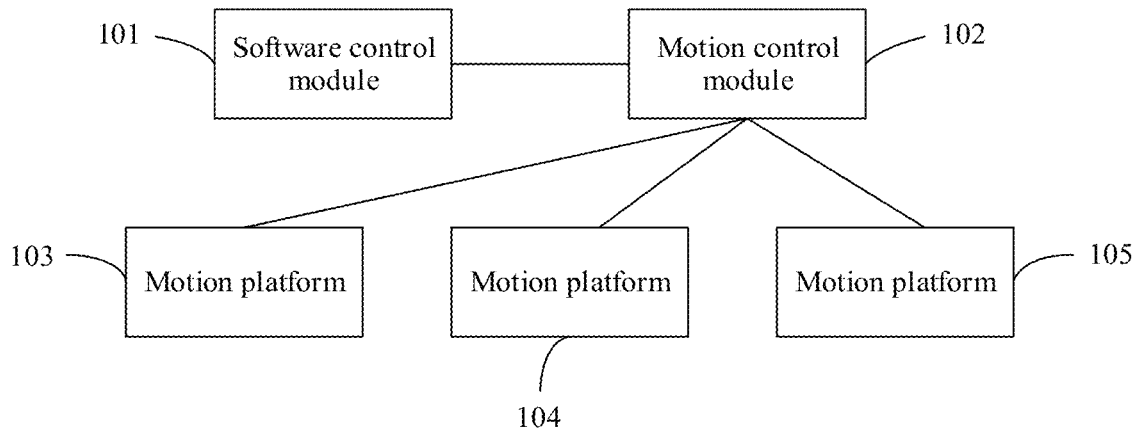
FIG. 1A is a schematic diagram 1 of an architecture of a test system according to an embodiment of this application.

The following describes implementations of embodiments of this application in detail with reference to the accompanying drawings.

A self-driving vehicle test method, apparatus, and system provided in embodiments of this application can be applied to any scenario in which a closed site test needs to be performed on a self-driving vehicle. According to the self-driving vehicle test method, apparatus, and system provided in embodiments of this application, self-driving vehicles in various scenarios with a closed site test can be tested without participation of test personnel, so that test efficiency is high, and labor costs are low. The test personnel in embodiments of this application are related personnel who participate in a test of the self-driving vehicle.

First, a system architecture to which embodiments of this application can be applied is described.

In an embodiment, the system architecture to which embodiments of this application can be applied includes a software control module, a motion control module, and a plurality of motion platforms. The software control module is communicatively connected to the motion control module. The motion control module is communicatively connected to the plurality of motion platforms. The plurality of motion platforms are communicatively connected to each other. For example, the foregoing modules are connected to each other, or the modules are connected to the motion platform by using a high-power wireless fidelity (Wi-Fi) technology or the like. The plurality of motion platforms include a test motion platform and a target motion platform. The test motion platform is a tested motion platform. The target motion platform is a motion platform that assists in testing in a test scenario.

It may be understood that the software control module, the motion control module, the motion platform, the test motion platform, or the target motion platform may alternatively be named in another manner, which is not limited.

The software control module stores or is pre-configured with configuration information of various test scenarios. In embodiments of this application, the configuration information of the scenario may also be referred to as a configuration file, a configuration document, or the like of the scenario. This is not limited. A format of the configuration information may be extensible markup language (XML), JSON (JavaScript Object Notation), or the like.

For example, the format of the configuration information is XML, and configuration information of a test scenario may be shown as follows:

```
<Name="test motion platform 1"/>
    <DriSpeed Value="30.0000000000000000e+00"/>
    <InitPosition X₁="1.8860804268818999e+01"
Y₁="2.1281909654362000e+01" Z₁="0.0000000000000000e+00"/>
<Name="target motion platform 1"/>
    < DriSpeed Value="20.0000000000000000e+00"/>
    <InitPosition X₂="2.6660804256618999e+01"
Y₂="3.1288909654362000e+01" Z₂="0.0000000000000000e+00"/>
```

The configuration information of the test scenario indicates that the test scenario includes the test motion platform 1 and the target motion platform 1. A driving speed of the test motion platform 1 is 30 km/h, and an initial position of the test motion platform 1 in the test scenario is $(X_1, Y_1, Z_1)$. A driving speed of the target motion platform 1 is 20 km/h, and an initial position of the target motion platform 1 in the test scenario is $(X_2, Y_2, Z_2)$.

It may be understood that the configuration information in the XML format is merely an example. In an embodiment, the configuration information may further include more information than that in the foregoing example, and a name of each parameter in the configuration information may alternatively be different from that in the example.

In an embodiment, the configuration information is obtained based on data collected on a road, and/or data collected by using a simulation test, and/or a scenario specified by laws and regulations, and/or the like. For example, the test personnel may design various test scenarios based on the data collected on a road, and/or the data collected by using a simulation test, and/or the scenario specified by laws and regulations, and configure the configuration information based on various designed test scenarios.

It may be understood that, in a conventional technology, an L2 level automation technology is used. In the L2 level automation technology, there are a relatively small quantity of test scenarios, and a relatively small quantity of objects (for example, a tested self-driving vehicle, a vehicle other than the tested self-driving vehicle, or a device used to sense a surrounding situation) in the test scenario, and a relationship between objects in the test scenario is relatively simple. However, more test scenarios than those in the L2 level automation technology may be designed based on the data collected on a road, and/or the data collected by using a simulation test, and/or the scenario specified by laws and regulations, so that the self-driving vehicle is tested more comprehensively.

One piece of configuration information corresponds to one test scenario. For example, an overtaking scenario corresponds to configuration information 1, and an emergency braking scenario corresponds to configuration information 2. The configuration information is used to indicate information about a test scenario corresponding to the configuration information. For example, the configuration information may indicate a quantity of test motion platforms and a quantity of target motion platforms in a test scenario corresponding to the configuration information, a start position and a start speed of the test motion platform, a start position and a start speed of the target motion platform, and the like.

Further, if one test scenario includes a plurality of cases, one piece of configuration information may correspond to one case in one test scenario, or may correspond to a plurality of cases in one test scenario. For example, the emergency braking scenario includes a case 1 and a case 2. The case 1 is used to indicate that braking starts 10 meters away from a front vehicle, and the case 2 is used to indicate that braking starts 5 meters away from the front vehicle. In an embodiment, the case 1 in the emergency braking scenario corresponds to configuration information A, and the case 2 in the emergency braking scenario corresponds to configuration information B. In this implementation, the configuration information A includes a description of the case 1, and the configuration information B includes a description of the case 2. In another possible implementation, both the case 1 and the case 2 in the emergency braking scenario correspond to configuration information C. In this implementation, the configuration information C needs to include descriptions of the case 1 and the case 2.

It may be understood that, in a use process, test personnel may maintain configuration information in the software control module. For example, the test personnel may delete, update, or add configuration information in the software control module. For example, when a test scenario does not need to be tested, the test personnel may delete configuration information of the test scenario from the software control module. For another example, when a parameter corresponding to a test scenario needs to be updated, the test personnel may update configuration information of the test scenario. When there is a new test scenario, the test personnel may add configuration information of the new test scenario to the software control module.

In an embodiment, the software control module may obtain information about the test scenario, and send the information about the test scenario to the motion control module.

The motion control module is configured to control the foregoing plurality of motion platforms. For example, the motion control module may determine a status of each motion platform. For example, the motion control module may determine whether a motion platform is in an in-use state or an idle state. The motion control module may further determine a test motion platform and a target motion platform from motion platforms in an idle state based on the received information about the test scenario. The motion control module may further communicate with the motion platform. For example, the motion control module may send parameter information of a determined test motion platform to the test motion platform, and send parameter information of a determined target motion platform to the target motion platform. The motion control module may further coordinate parameters between motion platforms during a test process, to assist the motion platforms in completing a test.

The motion platform may carry various types of simulated objects. For example, the plurality of motion platforms may include one or more of the following: a fake person, a fake vehicle, an obstacle, a bicycle, an electric vehicle, a tricycle, and a self-driving vehicle. The fake person may be used to simulate a motion situation of a person, for example, a position of the person, a motion speed of the person, and a motion track of the person. The fake vehicle may simulate a motion status of a vehicle, for example, a position of the vehicle, a motion speed of the vehicle, and a motion track of the vehicle. In an embodiment, when the self-driving vehicle is tested, a real vehicle may be used for the test, or a fake vehicle may be used for the test.

In an embodiment, the motion platform may communicate with the motion control module. For example, the motion platform may receive parameter information of the motion platform from the motion control module. The motion platform may further perform an operation corresponding to the parameter information based on the received parameter information of the motion platform.

In an embodiment, the system architecture to which embodiments of this application can be applied further includes a positioning module and/or a sensing module. The positioning module is communicatively connected to the plurality of motion platforms, and the positioning module is further communicatively connected to the software control module. For example, the positioning module is communicatively connected to the motion platform and the software control module by using a high-power Wi-Fi technology. The positioning module is configured to obtain position information of the motion platform. The positioning module is further configured to send the position information of the motion platform to the software control module. The positioning module may be an apparatus, such as a positioning base station, configured to obtain position information of various apparatuses.

The sensing module is communicatively connected to the software control module. For example, the sensing module and the software control module are communicatively connected by using a technology such as high-power Wi-Fi. The sensing module is configured to obtain image information of the test scenario. For example, the sensing module may include a camera, and the camera may shoot an image of the test scenario, and obtain the image information of the test scenario. The sensing module is further configured to send the obtained image information of the test scenario to the software control module, so that the software control module displays an image corresponding to the image information based on the received image information.

It may be understood that the sensing module and the positioning module may alternatively be named in another manner, which is not limited.

For example, the system architecture may be shown in FIG. 1A. The system architecture shown in FIG. 1A includes a software control module 101, a motion control module 102, and a motion platform 103 to a motion platform 105. The software control module 101 is communicatively connected to the motion control module 102, and the motion control module 102, the motion platform 103, the motion platform 104, and the motion platform 105 are communicatively connected to each other.

The software control module 101 may be configured to: obtain information about a first test scenario, and send the information about the first test scenario to the motion control module. The information about the first test scenario is used to indicate a quantity of test motion platforms, a quantity of target motion platforms, and parameter information of each motion platform in the first test scenario. The test motion platform is a tested motion platform, and the target motion platform is a motion platform that assists in testing in a test scenario. Parameter information of the motion platform is used to indicate a motion status of the motion platform in the first test scenario.

The motion control module 102 may be configured to: receive the information about the first test scenario from the software control module 101, determine a test motion platform and a target motion platform from the plurality of motion platforms based on the information about the first test scenario, send parameter information of each determined test motion platform to the test motion platform, and send parameter information of each determined target motion platform to the target motion platform.

The motion platform in FIG. 1A, for example, the motion platform 103, the motion platform 104, or the motion platform 105, may be configured to receive parameter information of the motion platform from the motion control module 102, and perform an operation corresponding to the parameter information of the motion platform based on the parameter information of the motion platform.

In an embodiment, the system architecture shown in FIG. 1A may further include a positioning module and/or a sensing module (not shown in FIG. 1A). For descriptions of the positioning module and/or the sensing module, refer to the foregoing description. Details are not described again. It may be understood that the positioning module may alternatively be integrated in the software control module 101 or the motion control module 102.

Figure 1B:
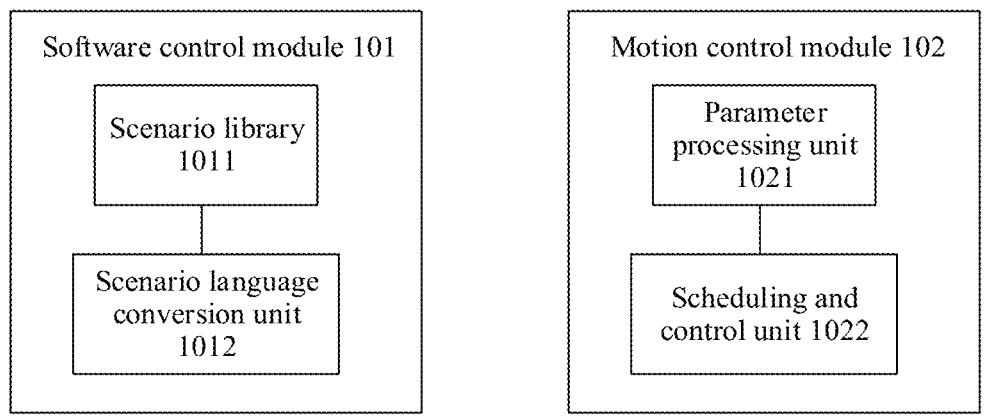
FIG. 1B is a schematic diagram of a structure of a software control module, a motion control module, and a motion platform according to an embodiment of this application.
Figure 1B:
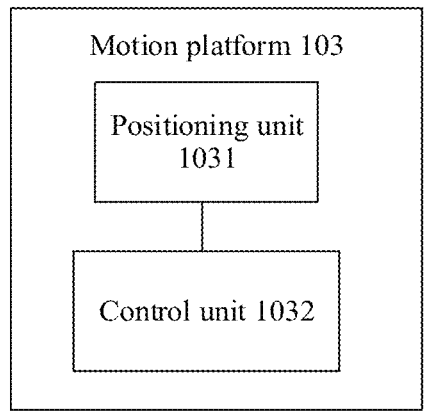

In an embodiment, a structure of the software control module 101, a structure of the motion control module 102, and a structure of the motion platform (the motion platform 103 is used as an example) in FIG. 1A may be shown in FIG. 1B.

In FIG. 1B, the software control module 101 includes a scenario library 1011 and a scenario language conversion unit 1012. The scenario library stores or is pre-configured with configuration information of various test scenarios. The scenario language conversion unit 1012 may be configured to convert configuration information in the scenario library 1011 into information about a test scenario corresponding to the configuration information.

The motion control module 102 includes a parameter processing unit 1021 and a scheduling and control unit 1022. The parameter processing unit 1021 may be configured to process information about a test scenario. For example, the parameter processing unit 1021 may obtain a quantity of test motion platforms, a quantity of target motion platforms, and parameter information of each motion platform in the test scenario based on the information about the test scenario. The scheduling and control unit 1022 may be configured to: determine a test motion platform and a target motion platform from a plurality of motion platforms, send parameter information of each determined test motion platform to the test motion platform, and send parameter information of each determined target motion platform to the target motion platform.

The motion platform 103 includes a positioning unit 1031 and a control unit 1032. The positioning unit 1031 may be configured to obtain position information of the motion platform 103. The control unit 1032 may be configured to perform an operation corresponding to parameter information of the motion platform 103 based on the parameter information.

A structure of the software control module 101, a structure of the motion control module 102, and a structure of the motion platform 103 shown in FIG. 1B are merely used as examples, and are not intended to limit the technical solutions of this application. One of ordinary skilled in the art should understand that, in an implementation process, the software control module, the motion control module, or the motion platform may alternatively include another module, which is not limited.

The software control module and the motion control module are two different modules. In an embodiment, the software control module and the motion control module may alternatively be integrated into one module. The integrated module has functions of both the software control module and the motion control module.

Figure 1C:
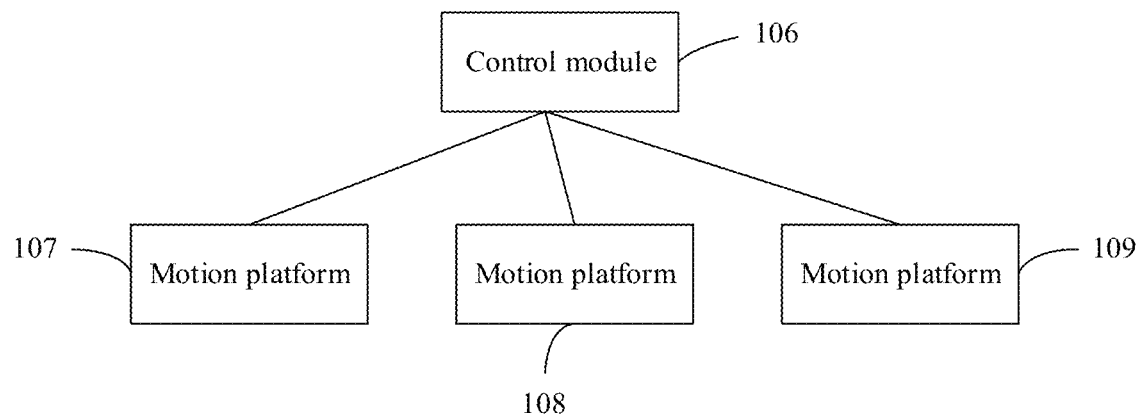
FIG. 1C is a schematic diagram 2 of an architecture of a test system according to an embodiment of this application.

For example, the system architecture provided in an embodiment of the application may be shown in FIG. 1C. The system architecture shown in FIG. 1C includes a control module 106 and a motion platform 107 to a motion platform 109.

The control module 106 may have functions of the software control module 101 and the motion control module 102. For example, the control module 106 may be configured to: obtain information about a first test scenario, determine a test motion platform and a target motion platform from a plurality of motion platforms based on the information about the first test scenario, send parameter information of each determined test motion platform to the test motion platform, and send parameter information of each determined target motion platform to the target motion platform.

The motion platform in FIG. 1C, for example, the motion platform 107, the motion platform 108, or the motion platform 109, may be configured to receive parameter information of the motion platform from the control module 106, and perform an operation corresponding to the parameter information of the motion platform based on the parameter information of the motion platform.

In an embodiment, the system architecture shown in FIG. 1C may further include a positioning module and/or a sensing module (not shown in FIG. 1C). For descriptions of the positioning module and/or the sensing module, refer to the foregoing description. Details are not described again. It may be understood that the positioning module may alternatively be integrated into the control module 106.

The system architectures shown in FIG. 1A and FIG. 1C are merely used as examples, and are not intended to limit the technical solutions of this application. One of ordinary skilled in the art should understand that, in an implementation process, the system architecture may further include another device or module, and a quantity of software control modules, motion control modules, motion platforms, or control modules may be determined based on a requirement. This is not limited.

In an embodiment, the module or the motion platform in FIG. 1A and FIG. 1C in the embodiments of this application, for example, the software control module 101, the motion control module 102, the motion platform 103, the control module 106, or the motion platform 107, may be a functional module in an apparatus. It may be understood that the functional module may be an element in a hardware device, for example, a chip or a component in a test apparatus, or may be a software functional module running on hardware, or a virtualized function instantiated on a platform (for example, a cloud platform).

Figure 2:
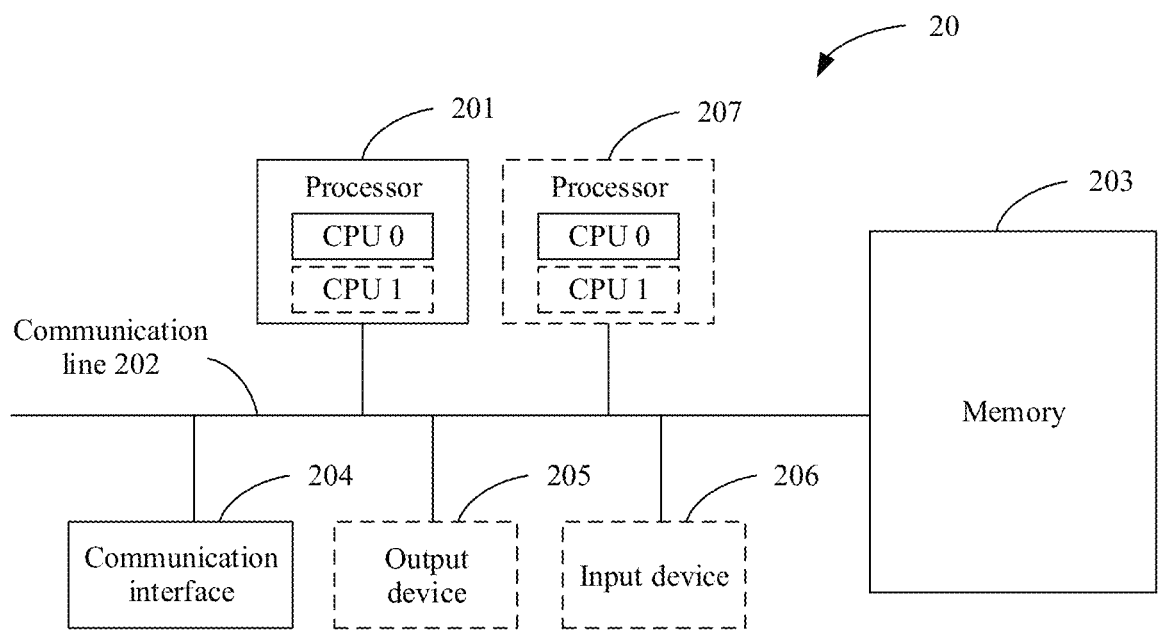
FIG. 2 is a schematic diagram of a hardware structure of a test apparatus according to an embodiment of this application.

For example, the module or the motion platform in FIG. 1A and FIG. 1C may be implemented by using a test apparatus 20 in FIG. 2. FIG. 2 is a schematic diagram of a hardware structure of a test apparatus applicable to an embodiment of this application. The test apparatus 20 includes at least one processor 201 and at least one communication interface 204, configured to implement the method provided in the embodiment of this application. The test apparatus 20 may further include a communication line 202 and a memory 203.

The processor 201 may be a general-purpose central processing unit (CPU), a microprocessor, an application-specific integrated circuit (ASIC), or one or more integrated circuits configured to control execution of programs in the solutions in this application.

The communication line 202 may include a path, for example, a bus, for transmitting information between the foregoing components.

The communication interface 204 is configured to communicate with another device or module. The communication interface 204 may be any apparatus such as a transceiver, for example, may be an Ethernet interface, a radio access network (RAN) interface, a wireless local area network (WLAN) interface, a pin, a bus, or a transceiver circuit.

The memory 203 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction structure or a data structure and that is accessible to a computer, but is not limited thereto. The memory may exist independently, and is coupled to the processor 201 by using the communication line 202. The memory 203 may alternatively be integrated with the processor 201. The memory provided in an embodiment of the application may be usually non-volatile. The memory 203 is configured to store computer-executable instructions for executing solutions provided in embodiments of this application, and the processor 201 controls execution. The processor 201 is configured to execute the computer-executable instructions stored in the memory 203, to implement a method provided in embodiments of this application.

The computer-executable instructions in embodiments of this application may alternatively be referred to as application code. This is not limited in embodiments of this application.

The coupling in an embodiment of the application may be an indirect coupling or a communication connection between apparatuses, units, or modules in an electrical form, a mechanical form, or another form, and is used for information exchange between the apparatuses, the units, or the modules.

In an embodiment, the processor 201 may include one or more CPUs, for example, a CPU 0 and a CPU 1 in FIG. 2.

In an embodiment, the test apparatus 20 may include a plurality of processors, for example, the processor 201 and a processor 207 in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

In an embodiment, the test apparatus 20 may further include an output device 205 and/or an input device 206. The output device 205 is coupled to the processor 201, and may display information in a plurality of manners. For example, the output device 205 may be a liquid crystal display (LCD), a light emitting diode (LED) display device, a cathode ray tube (CRT) display device, or a projector. The input device 206 is coupled to the processor 201, and may receive an input of a user in a plurality of manners. For example, the input device 206 may be a mouse, a keyboard, a touchscreen device, or a sensor device.

The test apparatus 20 may be a general-purpose device or a dedicated device. In an embodiment, the test apparatus 20 may be a desktop computer, a portable computer, a network server, an embedded device, or a device having a structure similar to that in FIG. 2. A type of the test apparatus 20 is not limited in an embodiment of the application.

The following uses the system architecture shown in FIG. 1A as an example to describe the self-driving vehicle test method provided in embodiments of this application.

It should be noted that, in the following embodiments of this application, names of information between or names of parameters in information between modules, between a module and a motion platform, or the like are merely examples, and may be other names in implementation. This is not limited in embodiments of this application.

It should be noted that, in embodiments of this application, "/" may represent an "or" relationship between associated objects. For example, A/B may represent A or B. "and/or" may be used to describe a case in which three relationships exist between associated objects. For example, A and/or B may represent the following three cases: Only A exists, both A and B exist, and only B exists. A and B may be singular or plural.

To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as being more preferred or having more advantages than another embodiment or design scheme. Use of the term such as "example" or "for example" is intended to present a related concept in a manner for ease of understanding.

It should be noted that in embodiments of this application, for a technical feature, "first", "second", "third", "A", "B", "C", and "D" are used to distinguish between technical features in the technical feature, and there is no sequential order or size order between the technical features described by "first", "second", "third", "A", "B", "C", and "D".

It may be understood that a same operation or an operation or a technical feature having a same function in embodiments of this application may be mutually referenced in different embodiments.

It may be understood that, in embodiments of this application, the software control module, and/or the motion control module, and/or the motion platform, and/or the sensing module, and/or the positioning module may perform some or all of operations in embodiments of this application. These operations are merely examples. In embodiments of this application, other operations or variations of various operations may be further performed. In addition, the operations may be performed in a sequence different from a sequence presented in embodiments of this application, and not all the operations in embodiments of this application need to be performed.

In embodiments of this application, a structure of an execution body of the self-driving vehicle test method is not particularly limited, provided that the method provided in embodiments of this application can be implemented. For example, the self-driving vehicle test method provided in embodiments of this application may be performed by the software control module, or a component applied to the software control module, for example, a chip. This is not limited in this application. Alternatively, the self-driving vehicle test method provided in embodiments of this application may be performed by the motion control module, or a component applied to the motion control module, for example, a chip. This is not limited in this application. Alternatively, the self-driving vehicle test method provided in embodiments of this application may be performed by the motion platform, or a component applied to the motion platform, for example, a chip. This is not limited in this application. In the following embodiments, examples in which execution bodies of the self-driving vehicle test method are respectively the software control module, the motion control module, and the motion platform are used for description.

Figure 3:
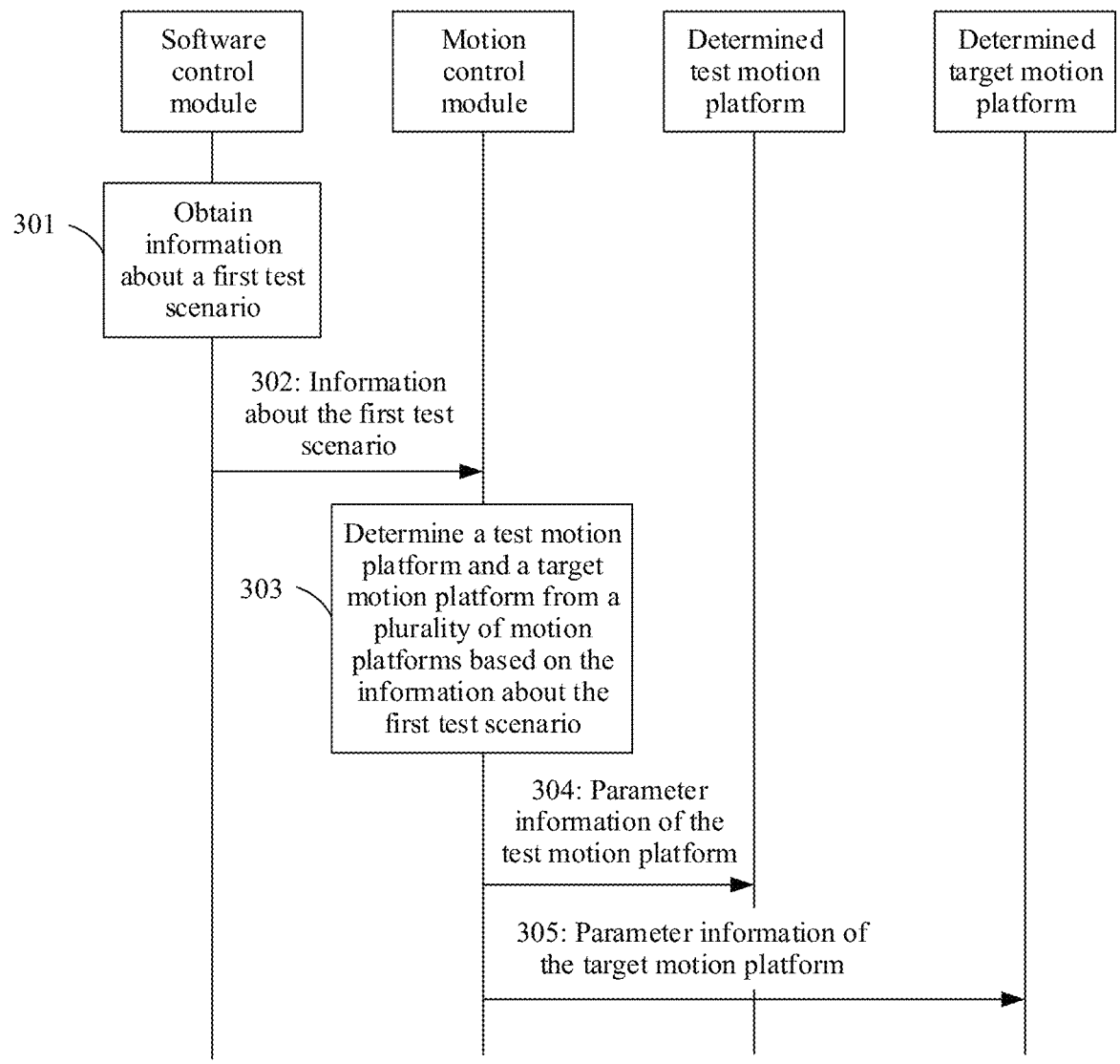
FIG. 3 is a schematic flowchart 1 of a self-driving vehicle test method according to an embodiment of this application.

FIG. 3 shows a self-driving vehicle test method according to an embodiment of this application. The self-driving vehicle test method includes operation 301 to operation 305.

Operation 301: A software control module obtains information about a first test scenario.

The software control module may be the software control module 101 in FIG. 1A.

In an embodiment, the information about the first test scenario is used to indicate a quantity of test motion platforms, a quantity of target motion platforms, and parameter information of each motion platform in the first test scenario.

The first test scenario includes at least one of the following scenarios: a traffic light recognition and response scenario, a traffic sign and marking recognition and response scenario, a front-vehicle driving status recognition and response scenario, an obstacle recognition and response scenario, a pedestrian and non-motor vehicle recognition and avoidance scenario, a vehicle-following driving scenario, a side parking scenario, an overtaking scenario, a lane changing scenario, an intersection communication scenario, a roundabout communication scenario, and an emergency braking scenario. For descriptions of the foregoing scenarios, refer to explanations and descriptions in a conventional technology. Details are not described. It may be understood that the first test scenario may further include another scenario that can be tested, which is not limited.

It may be understood that the motion platform in an embodiment of the application may be a fake person, a fake vehicle, an obstacle, a bicycle, an electric vehicle, a tricycle, a self-driving vehicle, or the like. For descriptions of the fake person and the fake vehicle, refer to the foregoing descriptions. Details are not described again.

The test motion platform is a tested motion platform, for example, a self-driving vehicle that needs to be tested. The target motion platform is a motion platform that assists in testing in a test scenario, for example, a fake person, an obstacle, a fake vehicle that assists in testing, or a self-driving vehicle that assists in testing.

The parameter information of the motion platform may be used to indicate a motion status of the motion platform in the first test scenario. For example, the parameter information of the motion platform may indicate a start position, a start speed, and the like of the motion platform.

In an embodiment, the parameter information of the motion platform includes at least one of the following parameters: information about an initial position of the motion platform in the first test scenario, a trigger condition that is of the first test scenario and that is corresponding to the motion platform, an end condition that is of the first test scenario and that is corresponding to the motion platform, a motion speed of the motion platform, information about a motion track of the motion platform, and parameter configuration information of the motion platform in a motion process.

The information about the initial position of the motion platform in the first test scenario may be used to indicate the initial position of the motion platform in the first test scenario, for example, coordinates of the initial position of the motion platform in the first test scenario. The initial position of the motion platform in the first test scenario may also be referred to as a start position of the motion platform in the first test scenario.

The trigger condition that is of the first test scenario and that is corresponding to the motion platform may be used to indicate a condition corresponding to the motion platform for triggering the first test scenario. For example, the first test scenario is the traffic light recognition and response scenario. The trigger condition that is of the first test scenario and that is corresponding to the motion platform may indicate the motion platform to start to recognize a traffic light at a crossroad when the motion platform is 10 meters away from the crossroad. For example, the first test scenario is the overtaking scenario. The trigger condition that is of the first test scenario and that is corresponding to the motion platform may indicate the motion platform to start overtaking when a speed per hour of a front motion platform is less than 60 km/h.

The end condition that is of the first test scenario and that is corresponding to the motion platform may be used to indicate a test end condition corresponding to the motion platform. For example, the first test scenario is the vehicle-following driving scenario. The end condition that is of the first test scenario and that is corresponding to the motion platform may indicate the motion platform to end the test when a driving distance following a motion platform in front is greater than 2 km.

The motion speed of the motion platform may include a start speed of the motion platform, and/or a driving speed of the motion platform, and/or a speed of the motion platform when the test ends, or the like. The start speed of the motion platform is a speed that needs to be reached in a preset time period after the motion platform is started.

The information about the motion track of the motion platform may be used to indicate a driving route of the motion platform in the first test scenario. For example, the lane changing scenario is used as an example. The information about the motion track of the motion platform may indicate a start position of lane changing of the motion platform, a time used by the motion platform from starting lane changing to ending lane changing, and the like.

The parameter configuration information of the motion platform in the motion process may be used to indicate parameter configuration of the motion platform in the motion process, for example, a moment at which the motion platform turns on a turn light, a moment at which the motion platform accelerates, and a moment at which the motion platform brakes.

In an embodiment, the information about the first test scenario further includes configuration information of the test motion platform in the first test scenario. The configuration information of the test motion platform is used to indicate a configuration of the test motion platform, for example, a model of the test motion platform.

In an embodiment, the software control module obtains the information about the first test scenario in response to an operation of test personnel; or the software control module obtains the information about the first test scenario according to a pre-stored program. For example, if the pre-stored program indicates that the test starts at 9 p.m., the software control module obtains the information about the first test scenario at 9 p.m.

In an embodiment, that a software control module obtains information about a first test scenario includes: The software control module determines configuration information of the first test scenario, and obtains the information about the first test scenario based on the configuration information of the first test scenario. Further, the software control module may determine and recognize the configuration information of the first test scenario, and extract the information about the first test scenario from the configuration information of the first test scenario.

For example, the configuration information of the first scenario is the information in the XML format described above. The information about the first test scenario includes: a quantity 1 of test motion platforms, a quantity 1 of target motion platforms, a driving speed of a test motion platform 1, an initial position of the test motion platform 1 in the first test scenario, a driving speed of a target motion platform 2, and an initial position of the target motion platform 2 in the first test scenario.

Operation 302: The software control module sends the information about the first test scenario to a motion control module.

The motion control module may be the motion control module 102 in FIG. 1A.

Correspondingly, the motion control module receives the information about the first test scenario from the software control module.

Operation 303: The motion control module determines a test motion platform and a target motion platform from a plurality of motion platforms based on the information about the first test scenario.

The plurality of motion platforms may include the motion platform 103, the motion platform 104, and the motion platform 105 in FIG. 1A.

In an embodiment, the motion control module determines a test motion platform and a target motion platform from motion platforms in an idle state of the plurality of motion platforms based on the quantity of test motion platforms and the quantity of target motion platforms that are indicated by the information about the first test scenario.

Operation 304: The motion control module sends parameter information of each determined test motion platform to the test motion platform.

Correspondingly, the determined test motion platform receives the parameter information of the test motion platform from the motion control module.

In an embodiment, the determined test motion platform receives the parameter information of the test motion platform from the motion control module, and performs a first operation based on the parameter information of the test motion platform.

For example, an example in which the first test scenario is the obstacle recognition and response scenario, the parameter information of the test motion platform includes information about an initial position of the test motion platform in the first test scenario, a trigger condition that is of the first test scenario and that is corresponding to the test motion platform, and a start speed of the test motion platform is used for description. If the information about the initial position of the test motion platform in the first test scenario indicates that the initial position of the test motion platform in the first test scenario is a position 100 meters away from an obstacle, the trigger condition that is of the first test scenario and that is corresponding to the test motion platform indicates the test motion platform to start to recognize the obstacle 20 meters away from the obstacle; and the start speed of the test motion platform reaches 40 km/h within 10 s after the test motion platform is started, after the test motion platform receives the parameter information of the test motion platform, the test motion platform travels into a test site corresponding to the first test scenario, and stops at a position 100 meters away from the obstacle. After the test starts, the test motion platform starts, travels towards the obstacle, and reaches 40 km/h within 10 s. When a distance between the test motion platform and the obstacle is 20 meters, the test motion platform starts to recognize the obstacle.

It may be understood that, the determined test motion platform receives the parameter information of the test motion platform from the motion control module, and may first travel into the test site corresponding to the first test scenario. The test motion platform stops at the initial position of the first test scenario, sends preparation completion indication information to another motion platform determined by the motion control module, and performs the first operation after receiving preparation completion indication information of the another motion platform.

Operation 305: The motion control module sends parameter information of each determined target motion platform to the target motion platform.

Correspondingly, the determined target motion platform receives the parameter information of the target motion platform from the motion control module.

In an embodiment, the determined target motion platform receives the parameter information of the target motion platform from the motion control module, and performs a second operation based on the parameter information of the target motion platform.

For example, an example in which the first test scenario is the front-vehicle driving status recognition and response scenario, and the parameter information of the target motion platform includes information about an initial position of the target motion platform in the first test scenario and parameter configuration information of the target motion platform in a motion process is used for description. If the information about the initial position of the target motion platform in the first test scenario includes $(X_1, Y_1, Z_1)$, and the parameter configuration information of the target motion platform in the motion process indicates the target motion platform to turn a left turn light 1 minute after the target motion platform is started and turn left, and increase a driving speed to 80 km/h 3 minutes after the target motion platform is started, the target motion platform travels into the test site corresponding to the first test scenario after receiving the parameter information of the target motion platform, and stops at a position whose coordinates are $(X_1, Y_1, Z_1)$. After the test starts, the target motion platform turns on the left turn light 1 minute after starting and turns left, and increases the driving speed to 80 km/h 3 minutes after starting.

It may be understood that the determined target motion platform receives the parameter information of the target motion platform from the motion control module, and may first travel into the test site corresponding to the first test scenario. The target motion platform stops at the initial position of the first test scenario, sends preparation completion indication information to another motion platform determined by the motion control module, and performs the second operation after receiving preparation completion indication information of the another motion platform.

It may be understood that an execution sequence of operation 304 and operation 305 is not limited in an embodiment of the application. For example, in the method shown in FIG. 3, operation 304 may be performed before operation 305, or operation 305 may be performed before operation 304, or operation 304 and operation 305 may be performed simultaneously.

Based on the method shown in FIG. 3, the software control module may obtain the information about the first test scenario, and send the information about the first test scenario to the motion control module. After receiving the information about the first test scenario, the motion control module may determine a test motion platform and a target motion platform from the plurality of motion platforms based on the information about the first test scenario, and send parameter information of each determined motion platform to the motion platform, so that the motion platform performs a corresponding operation based on the parameter information of the motion platform. In addition, in a test process, the motion control module and the motion platform may communicate with each other, and motion platforms may communicate with each other, so as to coordinate a parameter at any time to complete a test together. In this way, a self-driving vehicle can be tested without participation of test personnel, thereby improving test efficiency and reducing labor costs. In addition, a test process is closed-loop control (without participation of test personnel), which can reduce an accumulated error in the test process and make a test result more accurate. It can be understood that, in a conventional technology, when there are a relatively large quantity of vehicles in a test scenario, test personnel need to configure a parameter of each vehicle, and import the parameter of each vehicle into the vehicle. This causes a relatively heavy workload and takes a relatively long time. If the method provided in an embodiment of the application is used, efficiency can be greatly improved.

It should be understood that, in the test system provided in embodiments of this application, a plurality of test scenarios may be simultaneously tested. That is, the software control module may simultaneously obtain information about a plurality of test scenarios, and send the information about the plurality of test scenarios to the motion control module. After receiving the information about the plurality of test scenarios, the motion control module may determine a motion platform for each test scenario, and send parameter information of each motion platform to the motion platform, so that each motion platform performs a corresponding operation. In this way, parallel tests in a plurality of test scenarios can be implemented, and test efficiency can be improved.

For example, in an embodiment of the method shown in FIG. 3, the positioning module may obtain position information of the determined test motion platform and position information of the determined target motion platform, and send the position information of the determined test motion platform and the position information of the determined target motion platform to the software control module, so that the software control module displays positions of the determined test motion platform and the determined target motion platform on a map. For example, as shown in FIG. 4B, the method shown in FIG. 3 further includes operation 401 to operation 403.

Operation 401: The positioning module obtains position information of the determined test motion platform and position information of the determined target motion platform.

For the description of the positioning module, refer to the foregoing description. Details are not described again. The position information of the determined test motion platform may be used to indicate a position of the determined test motion platform, for example, coordinates of the determined test motion platform. The position information of the determined target motion platform may be used to indicate a position of the determined target motion platform, for example, coordinates of the determined target motion platform.

It may be understood that the positioning module may obtain the position information of the determined test motion platform and the position information of the determined target motion platform in real time.

It may be understood that the determined test motion platform may alternatively obtain the position information of the determined test motion platform, and send the position information of the determined test motion platform to the software control module by using the positioning module; or the determined test motion platform may obtain position information of the determined test motion platform, and directly send the position information of the determined test motion platform to the software control module. Similarly, the determined target motion platform may alternatively obtain the position information of the determined target motion platform, and send the position information of the determined target motion platform to the software control module by using the positioning module; or the determined target motion platform may obtain the position information of the determined target motion platform, and directly send the position information of the determined target motion platform to the software control module.

Operation 402: The positioning module sends the position information of the determined test motion platform and the position information of the determined target motion platform to the software control module.

Correspondingly, the software control module receives the position information of the determined test motion platform and the position information of the determined target motion platform from the positioning module.

Operation 403: The software control module displays positions of the determined test motion platform and the determined target motion platform on a map based on the position information of the determined test motion platform and the position information of the determined target motion platform.

For example, the position information of the determined test motion platform indicates the coordinates of the determined test motion platform, and the position information of the determined target motion platform indicates the coordinates of the determined target motion platform. The software control module displays the determined test motion platform at the coordinates of the determined test motion platform based on the position information of the determined test motion platform. The software control module displays the determined target motion platform at the coordinates of the determined target motion platform based on the determined position information of the target motion platform.

Figure 4A:
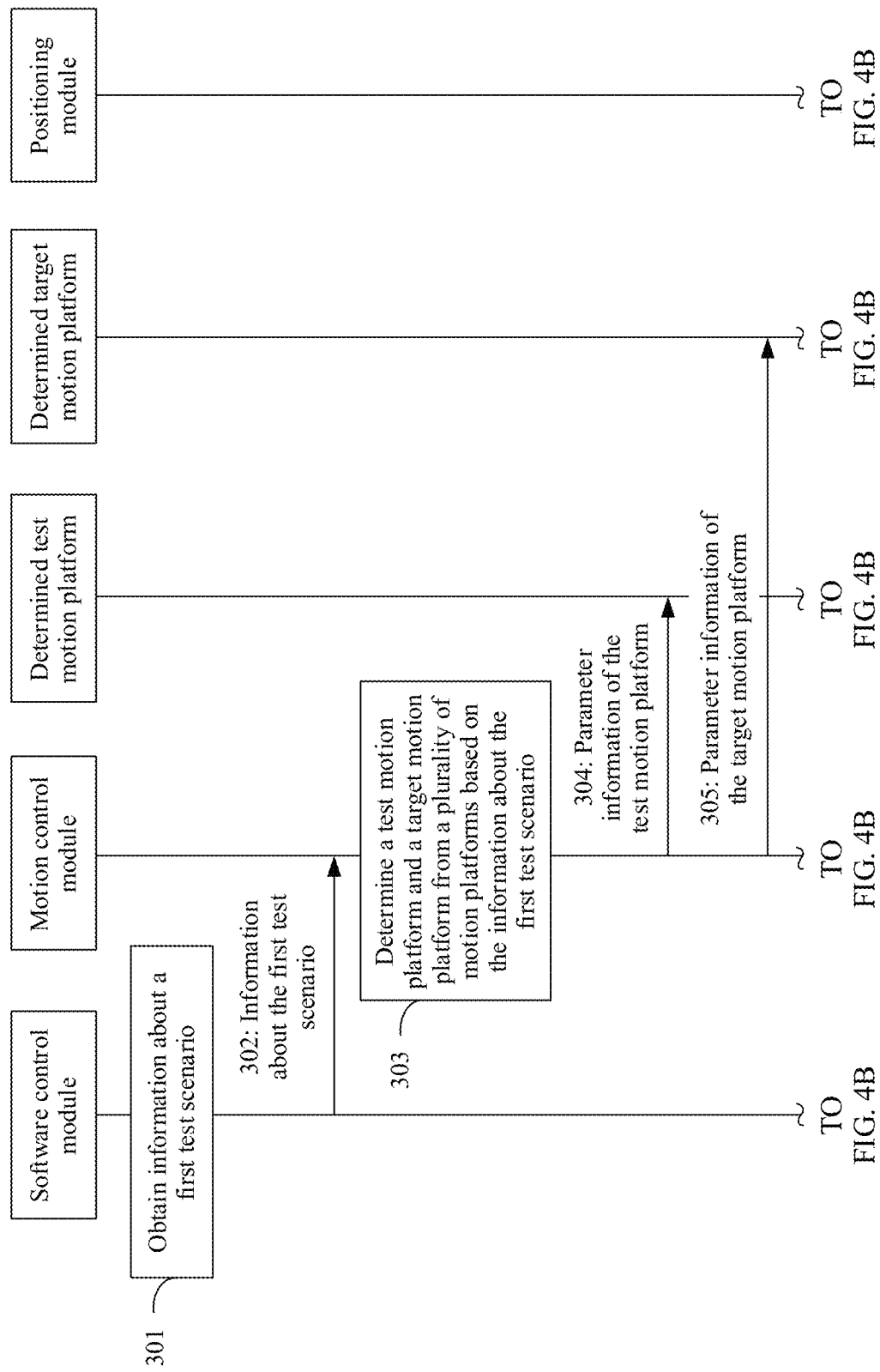
FIG. 4A and FIG. 4B are a schematic flowchart 2 of a self-driving vehicle test method according to an embodiment of this application.
Figure 4B:
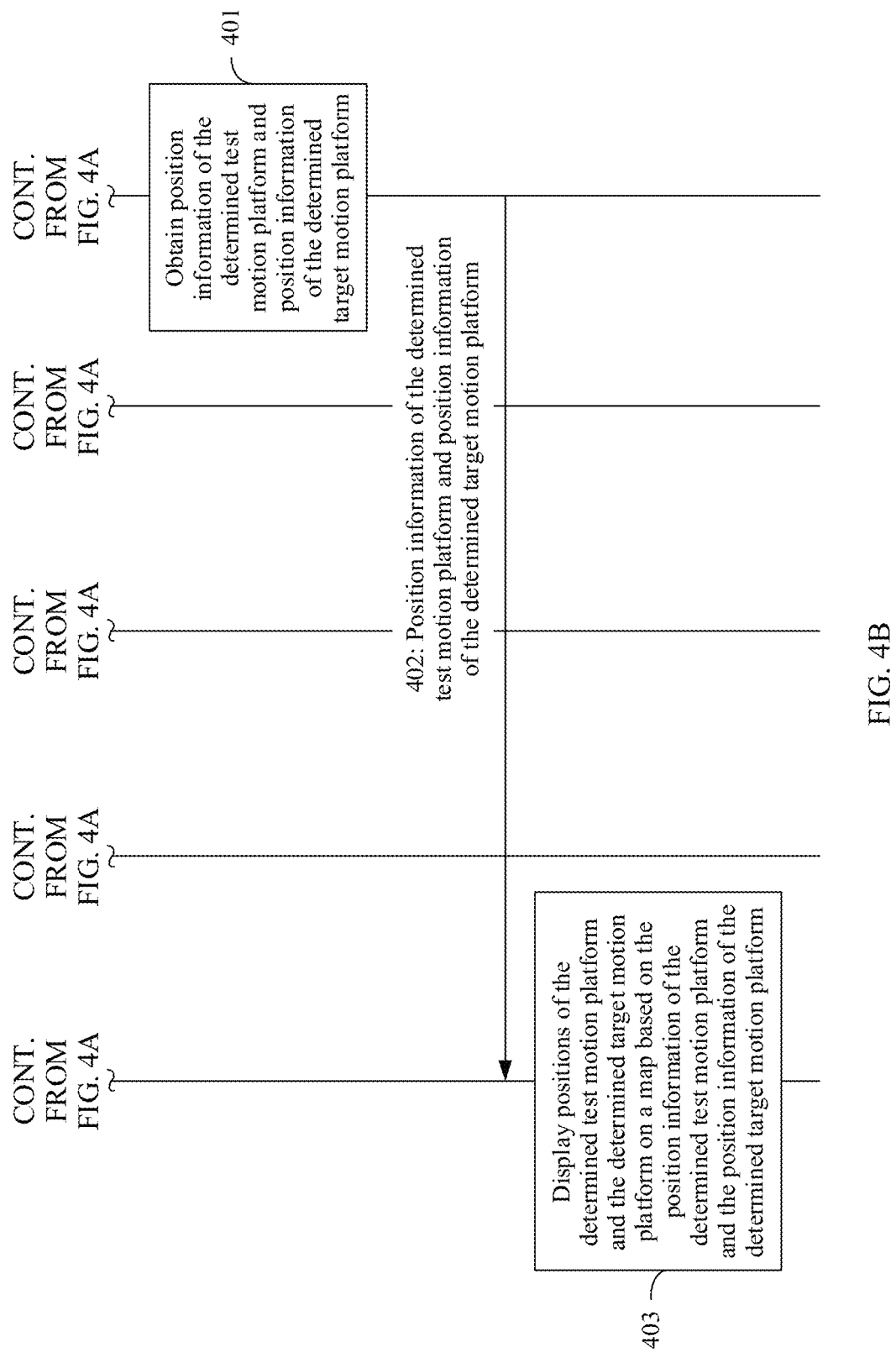

Based on the method shown in FIG. 4A and FIG. 4B, the software control module may display the positions of the determined test motion platform and the determined target motion platform on the map. In this way, the test personnel can observe the motion status of the motion platform in the first test scenario in real time.

Figure 5:
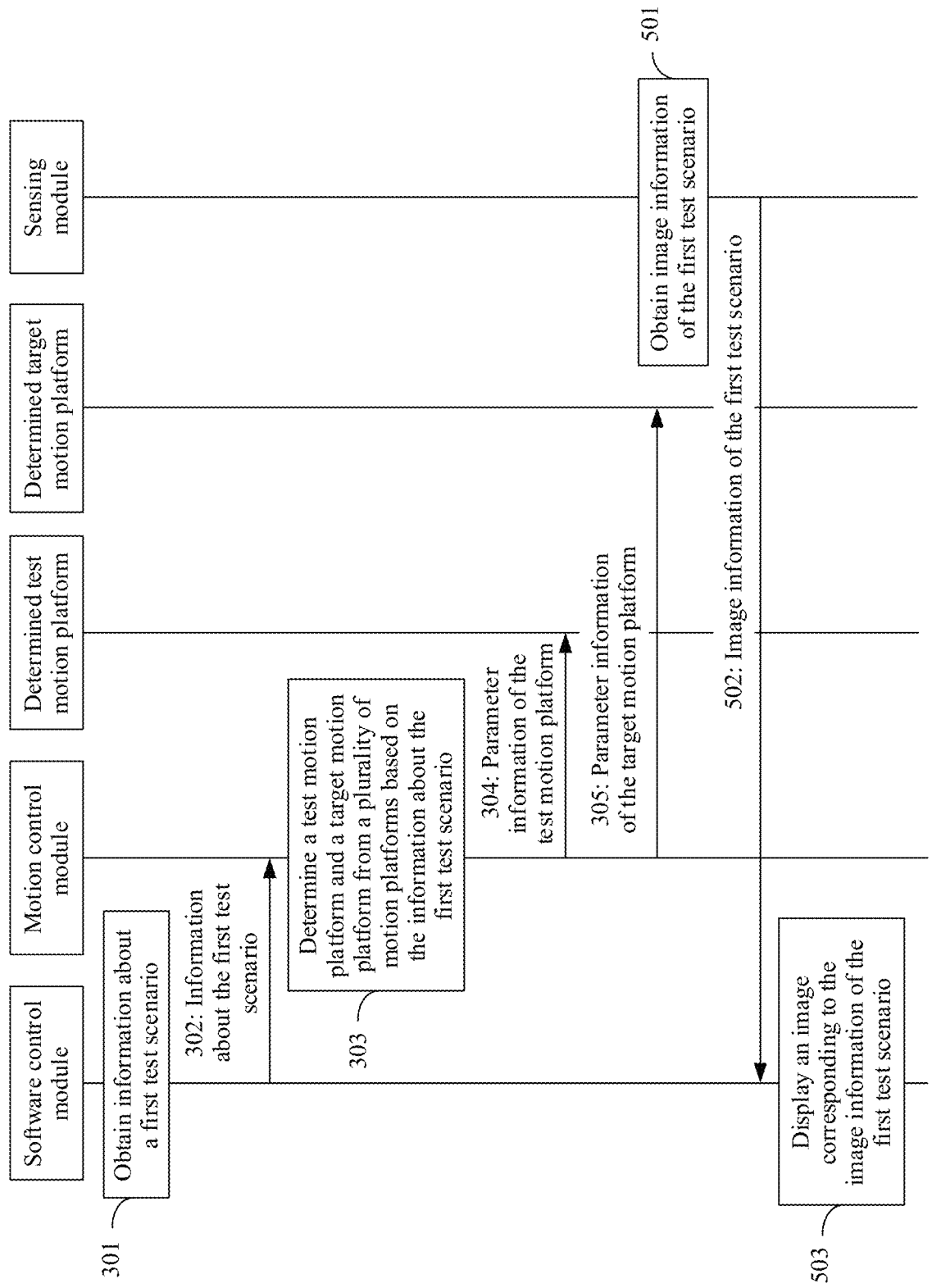
FIG. 5 is a schematic flowchart 3 of a self-driving vehicle test method according to an embodiment of this application.

For example, in an embodiment of the method shown in FIG. 3, the sensing module may obtain image information of the first test scenario, and send the image information to the software control module, so that the software control module displays an image corresponding to the image information. For example, as shown in FIG. 5, the method shown in FIG. 3 further includes operation 501 to operation 503.

Operation 501: The sensing module obtains image information of the first test scenario.

For the description of the sensing module, refer to the foregoing description. Details are not described again. The image information of the first test scenario includes an image or a video stream.

For example, a camera in the sensing module may shoot an image or a video of the motion platform in the first test scenario.

Operation 502: The sensing module sends the image information of the first test scenario to the software control module.

Correspondingly, the software control module receives the image information of the first test scenario from the sensing module.

Operation 503: The software control module displays an image corresponding to the image information of the first test scenario.

For example, the software control module may display an image or a video of the motion platform in the first test scenario.

Based on the method shown in FIG. 5, the software control module may display the image corresponding to the image information of the first test scenario, so that test personnel observe a status of the motion platform in the first test scenario.

It may be understood that operation 501 to operation 503 may also be applied to the method shown in FIG. 4A and FIG. 4B. This is not limited.

Figure 6:
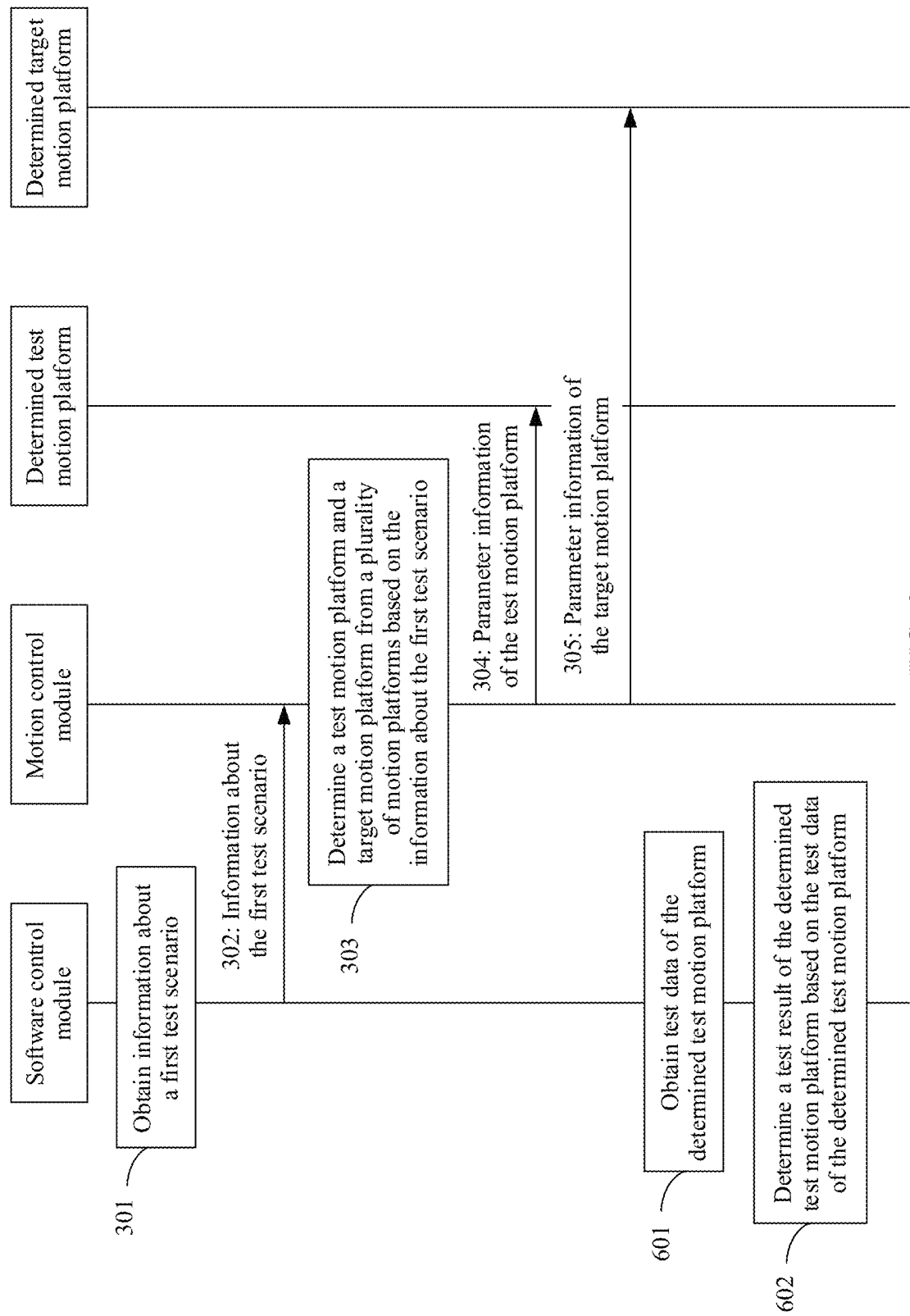
FIG. 6 is a schematic flowchart 4 of a self-driving vehicle test method according to an embodiment of this application.

For example, in an embodiment of the method shown in FIG. 3, the software control module may obtain test data of the determined test motion platform, and determine a test result of the determined test motion platform based on the test data. For example, as shown in FIG. 6, the method shown in FIG. 3 further includes operation 601 and operation 602.

Operation 601: The software control module obtains test data of the determined test motion platform.

The test data of the determined test motion platform includes various data of the determined test motion platform in the test process, for example, acceleration of the determined test motion platform, a time for accelerating the determined test motion platform from a first speed to a second speed, or data of each device (an engine, a braking system, or the like) on the determined test motion platform in the test process.

It may be understood that the test data of the determined test motion platform may be sent by the determined test motion platform to the software control module, or may be sent by the positioning module, the motion control module, or the like to the software control module. This is not limited.

It may be understood that the software control module may also obtain test data of the determined target motion platform, to assist in determining a test result of the determined test motion platform. For a description of the test data of the determined target motion platform, refer to the description of the test data of the determined test motion platform.

Operation 602: The software control module determines a test result of the determined test motion platform based on the test data of the determined test motion platform.

In an embodiment, the software control module may pre-store a plurality of test indicators, and the software control module determines the test result of the determined test motion platform based on the test indicator and the test data of the determined test motion platform.

For example, the first test scenario is the vehicle-following driving scenario, and the indicator stored in the software control module indicates that a distance from a front motion platform is greater than 5 meters. If a distance between the determined test motion platform and the front motion platform is always greater than 5 meters in the test process, the determined test motion platform passes the test. If the distance between the determined test motion platform and the front motion platform is less than 5 meters for a period of time in the test process, the determined test motion platform fails the test.

In another possible implementation, the software control module displays the test data of the determined target motion platform on a human-machine interaction interface, and a test result is determined by test personnel.

It may be understood that, if the software control module obtains the test data of the determined target motion platform, the software control module determines the test result of the determined test motion platform based on the test data of the determined target motion platform and the test data of the determined test motion platform.

It may be understood that operation 601 and operation 602 may also be applied to the method shown in FIG. 4A and FIG. 4B and/or the method shown in FIG. 5. This is not limited. Based on the method shown in FIG. 6, the software control module may obtain the test data of the determined test motion platform, and determine the test result of the determined test motion platform based on the test data, so that the test personnel determine whether the determined test motion platform is qualified.

The foregoing mainly describes the solutions provided in embodiments of this application from a perspective of interaction between various modules. It may be understood that, to implement the foregoing functions, the software control module, the motion control module, the motion platform, or the like includes a corresponding hardware structure and/or software module for performing each function. One of ordinary skilled in the art should be easily aware that, in combination with units and algorithm operations of the examples described in embodiments disclosed in this specification, this application can be implemented by hardware or a combination of hardware and computer software. Whether a function is performed by hardware or hardware driven by computer software depends on particular applications and design constraints of the technical solutions. One of ordinary skilled in the art may use different methods to implement the described functions for each particular application, but it should not be considered that the implementation goes beyond the scope of this application.

In embodiments of this application, functional module division may be performed on the software control module, the motion control module, or the motion platform based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. During actual implementation, another division manner may be used.

Figure 7:
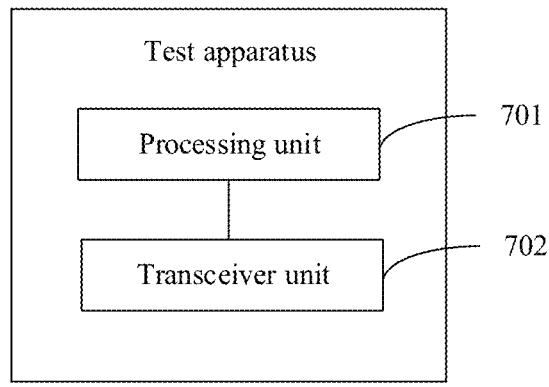
FIG. 7 is a schematic diagram 1 of a structure of a test apparatus according to an embodiment of this application.

For example, when the functional modules are obtained through division in an integrated manner, FIG. 7 is a schematic diagram of a structure of a test apparatus. The test apparatus may be a software control module, a chip or a system-on-a-chip in the software control module, or another combined device or component that can implement a function of the software control module. The test apparatus may be configured to perform a function of the software control module in the foregoing embodiments.

In an embodiment, the test apparatus shown in FIG. 7 includes a processing unit 701 and a transceiver unit 702.

The processing unit 701 is configured to obtain information about a first test scenario. The information about the first test scenario is used to indicate a quantity of test motion platforms, a quantity of target motion platforms, and parameter information of each motion platform in the first test scenario. The test motion platform is a tested motion platform, the target motion platform is a motion platform that assists in testing in a test scenario, and the parameter information of the motion platform is used to indicate a motion status of the motion platform in the first test scenario. For example, with reference to FIG. 3, the processing unit 701 may be configured to perform operation 301.

The transceiver unit 702 is configured to send the information about the first test scenario to a motion control module. For example, with reference to FIG. 3, the transceiver unit 702 may be configured to perform operation 302.

In an embodiment, the transceiver unit 702 is further configured to receive position information of a determined test motion platform and position information of a determined target motion platform from a positioning module, where the determined test motion platform and the determined target motion platform are motion platforms determined by the motion control module based on the information about the first test scenario; and the processing unit 701 is further configured to display positions of the determined test motion platform and the determined target motion platform on a map based on the position information of the determined test motion platform and the position information of the determined target motion platform.

In an embodiment, the transceiver unit 702 is further configured to receive image information of the first test scenario from a sensing module; and the processing unit 701 is further configured to display an image corresponding to the image information of the first test scenario.

In an embodiment, the processing unit 701 is further configured to obtain test data of the determined test motion platform, where the determined test motion platform is a motion platform determined by the motion control module based on the information about the first test scenario; and the processing unit 701 is further configured to determine a test result of the determined test motion platform based on the test data.

In an embodiment, the parameter information of the motion platform includes at least one of the following parameters: information about an initial position of the motion platform in the first test scenario, a trigger condition that is of the first test scenario and that is corresponding to the motion platform, an end condition that is of the first test scenario and that is corresponding to the motion platform, a motion speed of the motion platform, information about a motion track of the motion platform, and parameter configuration information of the motion platform in a motion process.

In an embodiment, the first test scenario includes at least one of the following scenarios: a traffic light recognition and response scenario, a traffic sign and marking recognition and response scenario, a front-vehicle driving status recognition and response scenario, an obstacle recognition and response scenario, a pedestrian and non-motor vehicle recognition and avoidance scenario, a vehicle-following driving scenario, a side parking scenario, an overtaking scenario, a lane changing scenario, an intersection communication scenario, a roundabout communication scenario, and an emergency braking scenario.

In an embodiment, the information about the first test scenario further includes configuration information of the test motion platform in the first test scenario.

All related content of the operations in the foregoing method embodiments may be cited in function descriptions of the corresponding functional modules. Details are not described herein again.

In an embodiment, the test apparatus is presented in a form of functional modules obtained through division in an integrated manner. The module herein may be an ASIC, a circuit, a processor that executes one or more software or firmware programs, a memory, an integrated logic circuit, and/or another component capable of providing the foregoing functions. In a simple embodiment, one of ordinary skilled in the art may figure out that the test apparatus may be in the form shown in FIG. 2.

For example, the processor 201 in FIG. 2 may invoke the computer-executable instructions stored in the memory 203, so that the test apparatus performs the method in the foregoing method embodiment.

For example, functions/implementation processes of the processing unit 701 and the transceiver unit 702 in FIG. 7 may be implemented by the processor 201 in FIG. 2 by invoking the computer-executable instructions stored in the memory 203. Alternatively, a function/an implementation process of the processing unit 701 in FIG. 7 may be implemented by the processor 201 in FIG. 2 by invoking the computer-executable instructions stored in the memory 203, and a function/an implementation process of the transceiver unit 702 in FIG. 7 may be implemented by the communication interface 204 in FIG. 2.

Because the test apparatus provided in an embodiment may perform the foregoing self-driving vehicle test method, for a technical effect that can be achieved by the test apparatus, refer to the foregoing method embodiments. Details are not described herein again.

Figure 8:
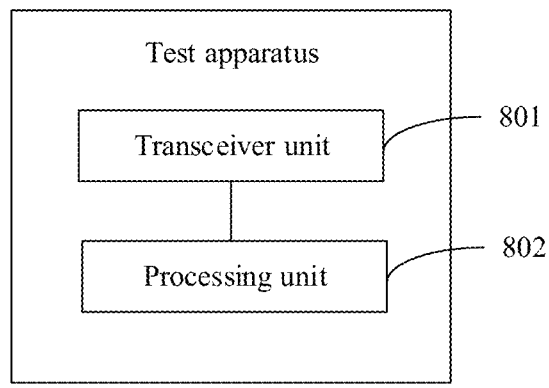
FIG. 8 is a schematic diagram 2 of a structure of a test apparatus according to an embodiment of this application.

For example, when the functional modules are obtained through division in an integrated manner, FIG. 8 is a schematic diagram of a structure of a test apparatus. The test apparatus may be a motion control module or a chip or a system-on-a-chip in the motion control module, or another combined device or component that can implement a function of the motion control module. The test apparatus may be configured to perform a function of the motion control module in the foregoing embodiments.

In an embodiment, the test apparatus shown in FIG. 8 includes a transceiver unit 801 and a processing unit 802.

The transceiver unit 801 is configured to receive information about a first test scenario from a software control module, where the information about the first test scenario is used to indicate a quantity of test motion platforms, a quantity of target motion platforms, and parameter information of each motion platform in the first test scenario, the test motion platform is a tested motion platform, the target motion platform is a motion platform that assists in testing in a test scenario, and the parameter information of the motion platform is used to indicate a motion status of the motion platform in the first test scenario. For example, with reference to FIG. 3, the transceiver unit 801 may be configured to perform operation 302.

The processing unit 802 is configured to determine a test motion platform and a target motion platform from a plurality of motion platforms based on the information about the first test scenario. For example, with reference to FIG. 3, the processing unit 802 may be configured to perform operation 303.

The transceiver unit 801 is further configured to send parameter information of each determined test motion platform to the test motion platform. For example, with reference to FIG. 3, the transceiver unit 801 may be further configured to perform operation 304.

The transceiver unit 801 is further configured to send parameter information of each determined target motion platform to the target motion platform. For example, with reference to FIG. 3, the transceiver unit 801 may be further configured to perform operation 305.

In an embodiment, the parameter information of the motion platform includes at least one of the following parameters: information about an initial position of the motion platform in the first test scenario, a trigger condition that is of the first test scenario and that is corresponding to the motion platform, an end condition that is of the first test scenario and that is corresponding to the motion platform, a motion speed of the motion platform, information about a motion track of the motion platform, and parameter configuration information of the motion platform in a motion process.

In an embodiment, the first test scenario includes at least one of the following scenarios: a traffic light recognition and response scenario, a traffic sign and marking recognition and response scenario, a front-vehicle driving status recognition and response scenario, an obstacle recognition and response scenario, a pedestrian and non-motor vehicle recognition and avoidance scenario, a vehicle-following driving scenario, a side parking scenario, an overtaking scenario, a lane changing scenario, an intersection communication scenario, a roundabout communication scenario, and an emergency braking scenario.

In an embodiment, the information about the first test scenario further includes configuration information of the test motion platform in the first test scenario.

All related content of the operations in the foregoing method embodiments may be cited in function descriptions of the corresponding functional modules. Details are not described herein again.

In an embodiment, the test apparatus is presented in a form of functional modules obtained through division in an integrated manner. The "module" herein may be an ASIC, a circuit, a processor that executes one or more software or firmware programs and a memory, an integrated logic circuit, and/or another device capable of providing the foregoing functions. In a simple embodiment, one of ordinary skilled in the art may figure out that the test apparatus may be in the form shown in FIG. 2.

For example, the processor 201 in FIG. 2 may invoke the computer-executable instructions stored in the memory 203, so that the test apparatus performs the method in the foregoing method embodiment.

For example, functions/implementation processes of the transceiver unit 801 and the processing unit 802 in FIG. 8 may be implemented by the processor 201 in FIG. 2 by invoking the computer-executable instructions stored in the memory 203. Alternatively, a function/an implementation process of the processing unit 802 in FIG. 8 may be implemented by the processor 201 in FIG. 2 by invoking the computer-executable instructions stored in the memory 203, and a function/an implementation process of the transceiver unit 801 in FIG. 8 may be implemented by the communication interface 204 in FIG. 2.

Because the test apparatus provided in an embodiment may perform the foregoing self-driving vehicle test method, for a technical effect that can be achieved by the test apparatus, refer to the foregoing method embodiments. Details are not described herein again.

Figure 9:
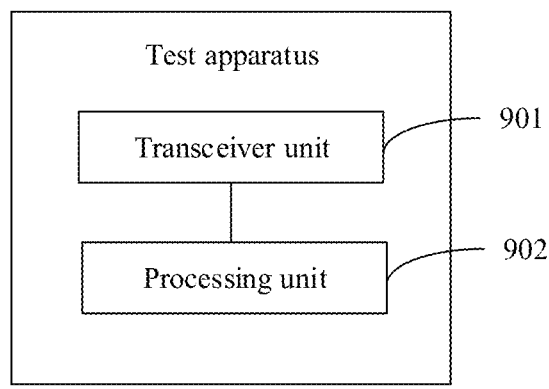
FIG. 9 is a schematic diagram 3 of a structure of a test apparatus according to an embodiment of this application.

For example, when the functional modules are obtained through division in an integrated manner, FIG. 9 is a schematic diagram of a structure of a test apparatus. The test apparatus may be a first motion platform, a chip or a system-on-a-chip on the first motion platform, or another combined device or component that can implement a function of the first motion platform. The test apparatus may be configured to perform a function of the first motion platform in the foregoing embodiments.

In an embodiment, the test apparatus shown in FIG. 9 includes a transceiver unit 901 and a processing unit 902.

The transceiver unit 901 is configured to receive parameter information of the test apparatus from a motion control module, where the parameter information of the test apparatus is used to indicate a motion status of the test apparatus in a first test scenario, and the test apparatus is a test motion platform or a target motion platform. For example, with reference to FIG. 3, the transceiver unit 901 may be configured to perform operation 304 or operation 305.

The processing unit 902 is configured to perform a first operation based on the parameter information of the test apparatus.

In an embodiment, the transceiver unit 901 is further configured to send test data of the test apparatus to a software control module, where the test data of the test apparatus includes data obtained by the test apparatus in a process of performing a test in the first test scenario.

In an embodiment, the test motion platform is a tested motion platform, and the target motion platform is a motion platform that assists in testing in a test scenario.

In an embodiment, the parameter information of the test apparatus includes at least one of the following parameters: information about an initial position of the test apparatus in the first test scenario, a trigger condition that is of the first test scenario and that is corresponding to the test apparatus, an end condition that is of the first test scenario and that is corresponding to the test apparatus, a motion speed of the test apparatus, information about a motion track of the test apparatus, and parameter configuration information of the test apparatus in a motion process.

All related content of the operations in the foregoing method embodiments may be cited in function descriptions of the corresponding functional modules. Details are not described herein again.

In an embodiment, the test apparatus is presented in a form of functional modules obtained through division in an integrated manner. The "module" herein may be an ASIC, a circuit, a processor that executes one or more software or firmware programs and a memory, an integrated logic circuit, and/or another device capable of providing the foregoing functions. In a simple embodiment, one of ordinary skilled in the art may figure out that the test apparatus may be in the form shown in FIG. 2.

For example, the processor 201 in FIG. 2 may invoke the computer-executable instructions stored in the memory 203, so that the test apparatus performs the method in the foregoing method embodiment.

For example, functions/implementation processes of the transceiver unit 901 and the processing unit 902 in FIG. 9 may be implemented by the processor 201 in FIG. 2 by invoking the computer-executable instructions stored in the memory 203. Alternatively, a function/an implementation process of the processing unit 902 in FIG. 9 may be implemented by the processor 201 in FIG. 2 by invoking the computer-executable instructions stored in the memory 203, and a function/an implementation process of the transceiver unit 901 in FIG. 9 may be implemented by the communication interface 204 in FIG. 2.

Because the test apparatus provided in an embodiment may perform the foregoing self-driving vehicle test method, for a technical effect that can be achieved by the test apparatus, refer to the foregoing method embodiments. Details are not described herein again.

Figure 10:
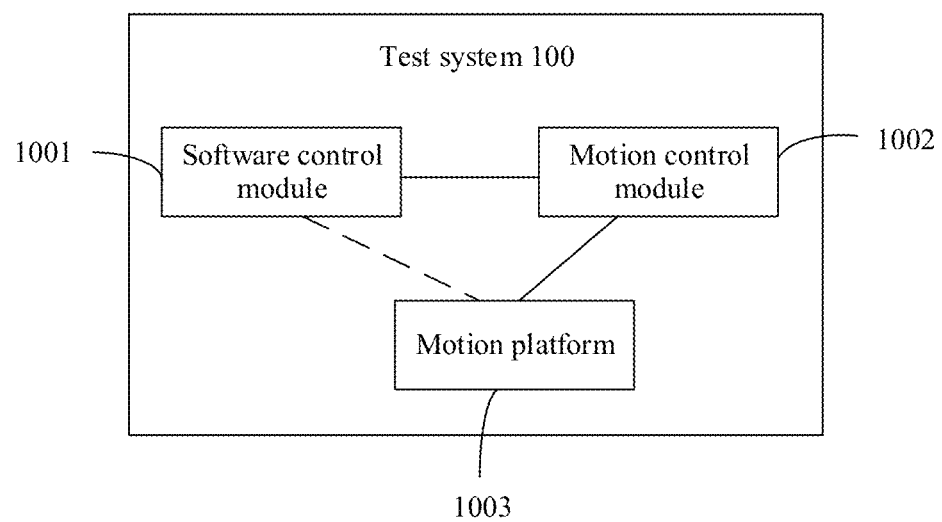
FIG. 10 is a schematic composition diagram of a test system according to an embodiment of this application.

FIG. 10 is a schematic composition diagram of a test system. As shown in FIG. 10, the test system 100 may include a software control module 1001, a motion control module 1002, and a motion platform 1003. It should be noted that FIG. 10 is merely an example accompanying drawing. A quantity of software control modules, motion control modules, or motion platforms included in the test system 100 shown in FIG. 10 is not limited in an embodiment of the application.

The software control module 1001 has a function of the test apparatus shown in FIG. 7, and may be configured to: obtain information about a first test scenario; and send the information about the first test scenario to the motion control module 1002.

The motion control module 1002 has a function of the test apparatus shown in FIG. 8, and may be configured to: receive the information about the first test scenario from the software control module 1001, determine a test motion platform and a target motion platform from a plurality of motion platforms based on the information about the first test scenario, and send parameter information of the motion platform 1003 to the motion platform 1003.

The motion platform 1003 has a function of the test apparatus shown in FIG. 9, and is configured to: receive the parameter information of the motion platform 1003 from the motion control module 1002, and perform a first operation based on the parameter information of the motion platform 1003.

It should be noted that all related content of the operations in the foregoing method embodiments may be referenced to the function description of the network element corresponding to the test system 100, and details are not described herein again.

Based on the foregoing descriptions of the implementations, one of ordinary skilled in the art may clearly understand that, for the purpose of convenient and brief description, division of the foregoing functional modules is merely used as an example for description. In an embodiment, the foregoing functions may be allocated to different functional modules for implementation according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example.

For example, the module or division into the units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor to perform all or some of the operations of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A self-driving vehicle test system, comprising:
a motion control module;
a plurality of motion platforms communicatively coupled to the motion control module, the plurality of motion platforms comprising:
a test motion platform, and
a target motion platform that assists in testing in a test scenario; and
a software control module configured to:
obtain information about a first test scenario, and
send the information about the first test scenario to the motion control module, wherein the information about the first test scenario is used to indicate a quantity of test motion platforms, a quantity of target motion platforms, wherein the test motion platform is a tested motion platform, wherein the target motion platform is to assist in testing in a test scenario, and parameter information of each motion platform in the first test scenario, and the parameter information of the motion platform is used to indicate a motion status of the motion platform in the first test scenario;
wherein the motion control module is configured to:
receive the information about the first test scenario from the software control module,
determine a test motion platform and a target motion platform from the plurality of motion platforms based on the information about the first test scenario,
send the parameter information of each determined test motion platform to the test motion platform, and
send the parameter information of each determined target motion platform to the target motion platform;
wherein the determined test motion platform is configured to:
receive the parameter information of the test motion platform from the motion control module, and
perform a first operation based on the parameter information of the test motion platform; and
wherein the determined target motion platform is configured to:
receive the parameter information of the target motion platform from the motion control module, and
perform a second operation based on the parameter information of the target motion platform.

2. The system according to claim 1, further comprising:
a positioning module communicatively connected to the software control module and the plurality of motion platforms;
wherein the positioning module is configured to:
obtain position information of the determined test motion platform and position information of the determined target motion platform, and
send the position information of the determined test motion platform and the position information of the determined target motion platform to the software control module; and
wherein the software control module is further configured to:
receive the position information of the determined test motion platform and the position information of the determined target motion platform from the positioning module, and
display positions of the determined test motion platform and the determined target motion platform on a map based on the position information of the determined test motion platform and the position information of the determined target motion platform.

3. The system according to claim 1, further comprising:
a sensing module communicatively connected to the software control module;
wherein the sensing module is configured to:
obtain image information of the first test scenario, and
send the image information of the first test scenario to the software control module; and
wherein the software control module is further configured to:
receive the image information of the first test scenario from the sensing module, and
display an image corresponding to the image information of the first test scenario.

4. The system according to claim 1, wherein
the software control module is further configured to:
obtain test data of the determined test motion platform, and
determine a test result of the determined test motion platform based on the test data.

5. The system according to claim 1, wherein the parameter information of the motion platform comprises at least one of: information about an initial position of the motion platform in the first test scenario, a trigger condition of the first test scenario corresponding to the motion platform, an end condition of the first test scenario corresponding to the motion platform, a motion speed of the motion platform, information about a motion track of the motion platform, or parameter configuration information of the motion platform in a motion process.

6. The system according to claim 1, wherein the first test scenario comprises at least one of: a traffic light recognition and response scenario, a traffic sign and marking recognition and response scenario, a front-vehicle driving status recognition and response scenario, an obstacle recognition and response scenario, a pedestrian and non-motor vehicle recognition and avoidance scenario, a vehicle-following driving scenario, a side parking scenario, an overtaking scenario, a lane changing scenario, an intersection communication scenario, a roundabout communication scenario, or an emergency braking scenario.

7. The system according to claim 1, wherein the information about the first test scenario further comprises configuration information of the test motion platform in the first test scenario.

8. A self-driving vehicle test method, comprising:
obtaining, by a software control module executed by a processor, information about a first test scenario, wherein the information about the first test scenario is used to indicate a quantity of test motion platforms, a quantity of target motion platforms, and parameter information of each motion platform in the first test scenario, wherein the test motion platform is a tested motion platform, wherein the target motion platform is to assist in testing in a test scenario, and wherein the parameter information of the motion platform is used to indicate a motion status of the motion platform in the first test scenario; and
sending, by the software control module executed by the processor, the information about the first test scenario to a motion control module.

9. The method according to claim 8, further comprising:
receiving, by the software control module executed by the processor, position information of a determined test motion platform and position information of a determined target motion platform from a positioning module, wherein the determined test motion platform and the determined target motion platform are determined by the motion control module based on the information about the first test scenario; and
displaying, by the software control module executed by the processor, positions of the determined test motion platform and the determined target motion platform on a map based on the position information of the determined test motion platform and the position information of the determined target motion platform.

10. The method according to claim 8, further comprising:
receiving, by the software control module executed by the processor, image information of the first test scenario from a sensing module; and
displaying, by the software control module executed by the processor, an image corresponding to the image information of the first test scenario.

11. The method according to claim 8, further comprising:
obtaining, by the software control module executed by the processor, test data of the determined test motion platform, wherein the determined test motion platform is a motion platform determined by the motion control module based on the information about the first test scenario; and
determining, by the software control module executed by the processor, a test result of the determined test motion platform based on the test data.

12. The method according to claim 8, wherein the parameter information of the motion platform comprises at least one of: information about an initial position of the motion platform in the first test scenario, a trigger condition of the first test scenario corresponding to the motion platform, an end condition of the first test scenario corresponding to the motion platform, a motion speed of the motion platform, information about a motion track of the motion platform, or parameter configuration information of the motion platform in a motion process.

13. The method according to claim 8, wherein the first test scenario comprises at least one of: a traffic light recognition and response scenario, a traffic sign and marking recognition and response scenario, a front-vehicle driving status recognition and response scenario, an obstacle recognition and response scenario, a pedestrian and non-motor vehicle recognition and avoidance scenario, a vehicle-following driving scenario, a side parking scenario, an overtaking scenario, a lane changing scenario, an intersection communication scenario, a roundabout communication scenario, or an emergency braking scenario.

14. The method according to claim 8, wherein the information about the first test scenario further indicates configuration information of the test motion platform in the first test scenario.

15. The method according to claim 8, further comprising:
receiving, by the motion control module executed by the processor, the information about the first test scenario from the software control module;
determining, by the motion control module executed by the processor, a test motion platform and a target motion platform from a plurality of motion platforms based on the information about the first test scenario;
sending, by the motion control module, the parameter information of each determined test motion platform to the test motion platform executed by the processor; and
sending, by the motion control module, parameter information of each determined target motion platform to the target motion platform.

16. The method according to claim 15, further comprising:
receiving, by a first motion platform, parameter information of the first motion platform from the motion control module, wherein the parameter information of the first motion platform is used to indicate a motion status of the first motion platform in the first test scenario, and wherein the first motion platform is a test motion platform or a target motion platform; and
performing, by the first motion platform, a first operation based on the parameter information of the first motion platform.

17. The method according to claim 16, further comprising:
sending, by the first motion platform, test data of the first motion platform to the software control module, wherein the test data of the first motion platform comprises data obtained by the first motion platform in a process of performing a test in the first test scenario.

18. A test apparatus, comprising:
a processor configured to obtain information about a first test scenario, wherein the information about the first test scenario is used to indicate a quantity of test motion platforms, a quantity of target motion platforms, and parameter information of each motion platform in the first test scenario, the test motion platform is a tested motion platform, the target motion platform is a motion platform that assists in testing in a test scenario, and the parameter information of the motion platform is used to indicate a motion status of the motion platform in the first test scenario; and a transceiver configured to send the information about the first test scenario to a motion control module.

19. The test apparatus according to claim 18, wherein the transceiver is further configured to:

receive position information of a determined test motion platform and position information of a determined target motion platform from a positioning module, wherein the determined test motion platform and the determined target motion platform are determined by the motion control module based on the information about the first test scenario; and the processor is further configured to:

display positions of the determined test motion platform and the determined target motion platform on a map based on the position information of the determined test motion platform and the position information of the determined target motion platform.

20. The test apparatus according to claim 18, wherein the transceiver is further configured to:

receive image information of the first test scenario from a sensing module; and the processor is further configured to:

display an image corresponding to the image information of the first test scenario.

* * * * *